US009203497B2

(12) United States Patent
Kim et al.

(10) Patent No.: US 9,203,497 B2
(45) Date of Patent: Dec. 1, 2015

(54) APPARATUS AND METHOD FOR SELECTING TRANSMIT AND RECEIVE BEAM IN A WIRELESS COMMUNICATION SYSTEM

(71) Applicant: Samsung Electronics Co., Ltd., Gyeonggi-do (KR)

(72) Inventors: Chan-Hong Kim, Gyeonggi-do (KR); Tae-Young Kim, Gyeonggi-do (KR); Ji-Yun Seol, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/275,784

(22) Filed: May 12, 2014

(65) Prior Publication Data

US 2014/0334566 A1 Nov. 13, 2014

(30) Foreign Application Priority Data

May 10, 2013 (KR) .................. 10-2013-0052993
May 12, 2014 (KR) .................. 10-2014-0056525

(51) Int. Cl.
*H04B 7/02* (2006.01)
*H04L 1/02* (2006.01)
*H04B 7/06* (2006.01)
*H04B 7/04* (2006.01)

(52) U.S. Cl.
CPC ............ *H04B 7/0695* (2013.01); *H04B 7/0469* (2013.01); *H04B 7/0617* (2013.01); *H04B 7/0639* (2013.01)

(58) Field of Classification Search
CPC .. H04B 7/0695; H04B 7/0469; H04B 7/0617; H04B 7/0639

USPC ......................................................... 375/267
See application file for complete search history.

(56) References Cited

U.S. PATENT DOCUMENTS

2009/0291702 A1   11/2009   Imai et al.
2009/0322613 A1   12/2009   Bala et al.
2012/0264469 A1   10/2012   Dartois et al.
(Continued)

FOREIGN PATENT DOCUMENTS

KR   20130025102 A   3/2013
KR   10-2013-0127376   11/2013
WO   WO 2010/145929 A1   12/2010

OTHER PUBLICATIONS

International Search Report dated Aug. 11, 2014 in connection with PCT/KR2014/004233; Samsung Electronics Co Ltd; 3 pages.
(Continued)

*Primary Examiner* — Erin File

(57) ABSTRACT

A method for operating a receiving end in a wireless communication system includes receiving subset information on analog beams of a transmitting end, from a transmitting end, and determining a combination of transmit beams to be used for data signal transmission to the receiving end, on the basis of the subset information, wherein the subset information indicates at least one subset into which the analog beams are classified, and each analog beam of the at least one subset has a correlation equal to or less than a threshold, with one another. An apparatus for a receiving end includes a communication unit configured to receive subset information on analog beams of a transmitting end, from the transmitting end, and a controller configured to determine a combination of transmit beams to be used for data signal transmission to the receiving end, on the basis of the subset information.

40 Claims, 17 Drawing Sheets

(56) References Cited

U.S. PATENT DOCUMENTS

2012/0327872 A1* 12/2012 Han .............................. 370/329
2013/0059619 A1   3/2013 Kim et al.
2013/0099973 A1   4/2013 Kwak
2013/0165785 A1*  6/2013 Lause ........................... 600/443

OTHER PUBLICATIONS

International Search Report dated Aug. 11, 2014 in connection with PCT/KR2014/004233; Samsung Electronics Co Ltd; 5 pages.

* cited by examiner

| BEAM COEFFICIENT OF BEAM #1 | BEAM COEFFICIENT OF BEAM #2 | .... | BEAM COEFFICIENT OF BEAM 1K |

FIG.9A

| MODE IDENTIFIER | SUBSET BITMAP |

FIG.9B

APPARATUS AND METHOD FOR SELECTING TRANSMIT AND RECEIVE BEAM IN A WIRELESS COMMUNICATION SYSTEM

PRIORITY

The present application is related to and claims priority under 35 U.S.C. §119(a) to a Korean Patent Application No. 10-2013-0052993 filed in the Korean Intellectual Property Office on May 10, 2013 and a Korean Patent Application No. 10-2014-0056525 filed in the Korean Intellectual Property Office on May 12, 2014, the contents of which are herein incorporated by reference.

TECHNICAL FIELD

The present disclosure relates to beamforming in a wireless communication system.

BACKGROUND

Today, the data usage of wireless communication networks is increasing by geometric progression. In accordance with this, the beyond 4-Generation (4G) mobile communication technology has to support Gigabyte-class communication even in the outdoor environment. The most highlighted candidate technology for this is a beamforming technology of a millimeter (mm) band. Compared to an existing low frequency band, the millimeter band has the merit of being capable of using a broadband. But, the millimeter band has the demerit of high channel attenuation. The beamforming is a technology capable of increasing a strength of a signal in a specific direction by using a plurality of antennas. In the past, many researches were made on the beamforming. So, the beamforming can integrate the plurality of antennas in a small region as a length of a wavelength decreases at a high frequency band. Accordingly, the beamforming technology is again attracting attention as a significant technology capable of overcoming the channel attenuation of the millimeter band.

The beamforming can be implemented anywhere in a digital end, i.e., a baseband, after Digital to Analog (D/A) conversion, or a Radio Frequency (RF) end. When the beamforming is implemented in the digital end, it is easy to adjust a beamforming coefficient, that is, a strength and phase of a signal. But, in this case, there are difficulties in cost and implementation because an RF chain joining baseband—D/A—RF should be provided every antenna. In contrast, when the beamforming is implemented in the RF end, it incurs a low price but has a difficulty in minutely adjusting the strength and phase of the signal.

Hybrid beamforming is a method of transmitting multiple data through a digital precoder and getting a beamforming gain through an RF beamformer, by constructing a baseband by only a few RF chains and again coupling the RF beamformer every each RF chain. Accordingly, the hybrid beamforming can achieve suitable trade-off compared to the aforementioned digital beamforming and analog beamforming technology.

The hybrid beamforming can be coupled with an Orthogonal Frequency Division Multiplexing (OFDM) system, and can be variously implemented in structure. For example, RF beamformers of a plurality of RF chains can be connected to a single physical array antenna through an adder. In this case, the array antenna connected with the RF beamformer of each RF chain is identical. Accordingly, a correlation of an effective channel of a baseband basis can greatly increase in accordance to a beam coefficient of each RF beamformer. In other words, a correlation between beams used for beamforming is varied in accordance to the beam coefficient. The variation of the correlation between the beams can make performance worse or better in accordance with a used Multiple Input Multiple Output (MIMO) mode. Therefore, the hybrid beamforming structure has to propose an alternative for suitably selecting a beam that will be actually used for data transmission/reception in consideration of the correlation between the beams.

SUMMARY

A method for operating a receiving end in a wireless communication system includes receiving subset information on analog beams of a transmitting end, from a transmitting end, and determining a combination of transmit beams to be used for data signal transmission to the receiving end, on the basis of the subset information, wherein the subset information indicates at least one subset into which the analog beams are classified, and each analog beam of the at least one subset has a correlation equal to or less than a threshold, with one another.

In some embodiments, the combination of the transmit beams belong to a same subset, and are spatially multiplexed.

In some embodiments, the determining the combination of the transmit beams includes identifying a number of analog beams that provide the best channel quality in each subset, wherein the number corresponds to a multiplexing order, calculating a channel quality sum of the number of the analog beams that are identified in each subset, and designating analog beams having the greatest channel quality sum in each subset as the combination of the transmit beams.

In some embodiments, the combination of the transmit beams comprises a number of transmit beams providing the greatest channel quality values, each transmit beam having a correlation less than a threshold, among all of the transmit beams, as a beam combination for spatial multiplexing, wherein the number is a same as a multiplexing order.

In some embodiments, determining the combination of the transmit beams comprises, selecting a first beam having the maximum channel quality among all of analog beams of the transmitting end, comparing the first beam with each of remnant beams in an order of higher channel quality, if a correlation between the first beam and one of the remnant beams is equal to or is greater than the threshold, excluding the one beam from the combination of the transmit beams, and if the correlation is less than the threshold, including the one beam into the combination of the transmit beams.

In some embodiments, determining the combination of the transmit beams, wherein each transmit beam belongs to different subsets for diversity.

In some embodiments, the determining the combination of the transmit beams includes selecting a first beam having the maximum channel quality among all of the analog beams of the transmitting end, comparing the first beam with each one of remnant analog beams in an order of higher channel quality, if one remnant analog beam belongs to the same subset as the first beam, excluding the one remnant analog beam from the combination of the transmit beams, and if the one remnant analog beam does not belong to the same subset as the first beam, including the one analog beam into the combination of the transmit beams.

In some embodiments, the combination of the transmit beams comprises the transmit beams of a subset, or a number of transmit beams having the greatest channel quality values among all of the transmit beams, wherein the number is a same as a diversity order, as a beam combination for diversity.

In some embodiments, the subset information comprises at least one of a set of magnitude and phase value vectors constituting analog beam coefficient of the transmitting end, a set of steering angle values representing the analog beam coefficients of the transmitting end, and a bitmap according to Multiple Input Multiple Output (MIMO) mode, representing classified subsets of the transmitting end.

In some embodiments, the method further includes determining, by the transmitting end, subsets classifying transmit beams such that correlations of all pair of two transmit beams of the subset are equal to or are less than the threshold.

In some embodiments, the at least one subset is determined distinctively in accordance with a Multiple Input Multiple Output (MIMO) mode.

In some embodiments, the subset information is received as system information periodically broadcasted, or is received during an initial access procedure, or is received after the initial access procedure, or is received as system information exchanged during a handover procedure.

In some embodiments, the method further includes measuring a channel quality by transmit beam using at least one reference signal transmitted by the transmitting end.

In some embodiments, the method further includes determining an effective channel according to the combination of the transmit beams, selecting a precoding matrix for digital beamforming on the basis of the effective channel, transmitting the combination of the transmit beams and the selected precoding matrix to the transmitting end, and receiving a data signal that is digitally beamformed by the precoding matrix and is analogy beamformed by the combination of the transmit beams in the transmitting end.

A method for operating a transmitting end in a wireless communication system includes transmitting subset information on analog beams of the transmitting end, receiving from the receiving end a combination of transmit beams which is determined on the basis of the subset information, and performing analog beamforming for data signal transmission to the receiving end, using the combination of the transmit beams, wherein the subset information indicates at least one subset into which the analog beams are classified and each analog beam of the at least one subset has a correlation equal to or less than a threshold, with one another.

In some embodiments, the combination of the transmit beams belong to a same subset and are spatially multiplexed.

In some embodiments, the combination of the transmit beams belong to different subsets for diversity.

In some embodiments, the subset information comprises at least one of a set of magnitude and phase value vectors constituting analog beam coefficients of the transmitting end, a set of steering angle values representing the analog beam coefficients of the transmitting end, and a bitmap according to MIMO mode representing a classified subset of the transmitting end.

In some embodiments, the subset information comprises different subset in accordance with a MIMO mode.

In some embodiments, the subset information is received as system information periodically broadcasted, or is received during an initial access procedure, or is received after the initial access procedure, or is received as system information exchanged during a handover procedure.

An apparatus for a receiving end in a wireless communication system, the apparatus includes a communication unit configured to receive subset information on analog beams of a transmitting end, from the transmitting end, and a controller configured to determine a combination of transmit beams to be used for data signal transmission to the receiving end, on the basis of the subset information, wherein the subset information comprises at least one subset into which the analog beams are classified, and each of analog beams has a correlation equal to or less than a threshold, with one another.

In some embodiments, the controller is configured to identify a subset of analog beams providing the best channel quality, calculate a channel quality sum of the analog beams of each subset, and determine the subset having the greatest channel quality sum, as the combination of the transmit beams.

In some embodiments, the controller is configured to select a first beam having the maximum channel quality among all the analog transmit beams of the transmitting end, compare the first beam with each one of remnant beams in an order of high channel quality, exclude one of the remnant analog beams from the combination of the transmit beams if a correlation between the first beam and the one of the remnant analog beams is equal to or is greater than the threshold, and include the one of the remnant analog beams into the combination of the transmit beams if the correlation is less than the threshold.

In some embodiments, the controller is configured to select a first beam having the maximum channel quality among all the analog beams of the transmitting end, compare the first beam with each one of remnant analog beams in an order of high channel quality is high, exclude one of the remnant analog beams from the combination of the transmit beams if the one of the remnant analog beam belongs to a same subset as the first beam, include the one of the remnant beams into the combination of the transmit beams if the one of the remnant beam does not belong to the same subset as the first beam.

In some embodiments, the controller is configured to determine the combination of the transmit beams, wherein each transmit beam belong to a specific subset, or a number of transmit beams is a same as a diversity order for greatest channel quality, as a beam combination for diversity.

In some embodiments, the controller is configured to determine, by the transmitting end, subset classifying transmit beams such that correlations of all pair of two transmit beams of the subset are equal to or are less than the threshold.

In some embodiments, the controller is configured to measure a channel quality by transmit beam using at least one reference signal transmitted by the transmitting end.

In some embodiments, the controller is configured to calculate an effective channel according to the combination of the transmit beams, and select a precoding matrix for digital beamforming on the basis of the effective channel, and wherein the communication unit is configured to transmit the combination of the transmit beams and the selected precoding matrix to the transmitting end, and receive a data signal that is digitally beamformed by the precoding matrix and is analogy beamformed by the combination of the transmit beams in the transmitting end.

An apparatus for a transmitting end in a wireless communication system includes a communication unit configured to transmit subset information on analog beams of the transmitting end, and receive from the receiving end a combination of transmit beams determined on the basis of the subset information, and a controller configured to perform analog beamforming for data signal transmission to the receiving end, using the combination of the transmit beams, wherein the subset information indicates at least one subset into which the analog beams are classified and each analog beam of the at least one subset has a correlation equal to or less than a threshold, with one another.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A and 9B illustrate examples of constructions of subset information in a wireless communication system according to embodiments of the present disclosure;

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be modified in accordance with user and operator's intention or practice. Therefore, the terms should be defined on the basis of the disclosure throughout this specification.

Below, the present disclosure describes a technology for selecting a beam for beamforming in a wireless communication system employing hybrid beamforming. Below, the present disclosure describes an Orthogonal Frequency Division Multiplexing/Orthogonal Frequency Division Multiple Access (OFDM/OFDMA) wireless communication system.

Figure 1:
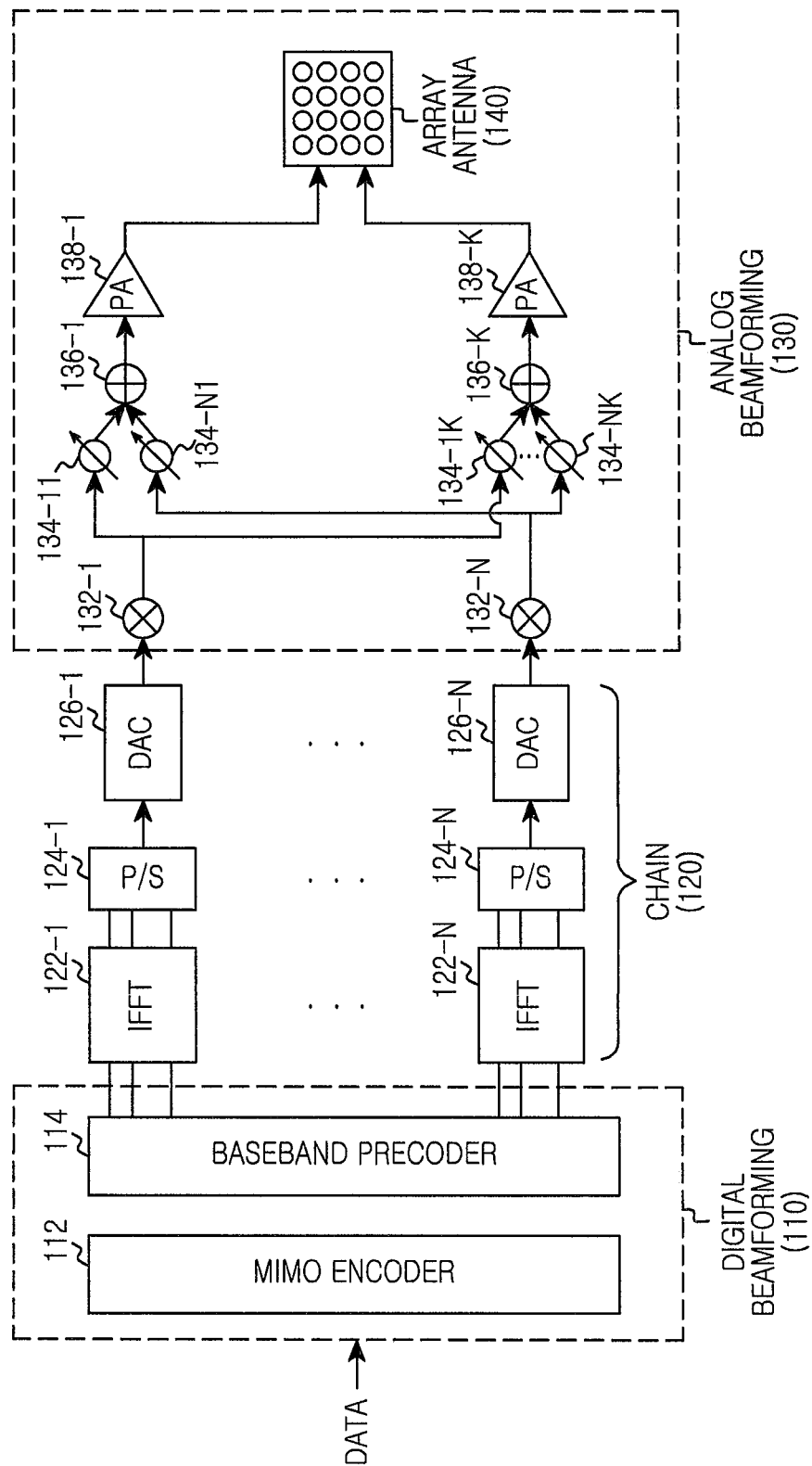
FIG. 1 illustrates a hybrid beamforming structure according to an embodiment of the present disclosure.

FIG. 1 illustrates a hybrid beamforming structure according to an exemplary embodiment of the present disclosure.

Referring to FIG. 1, the hybrid beamforming is performed through a digital beamforming block 110, a chain block 120, and an analog beamforming block 130. In detail, the digital beamforming block 110 includes a Multiple Input Multiple Output (MIMO) encoder 112 and a baseband precoder 114. The chain block 120 includes an 'N' number of chains. Each chain includes an Inverse Fast Fourier Transform (IFFT) block 122, a Parallel to Serial (P/S) block 124, and a Digital to Analog Converter (DAC) 126. The analog beamforming block 130 includes an 'N' number of mixers 132-1 to 132-N, RF beamformers 134-11 to 134-NK composed of an (N×K) number of phase and magnitude conversion elements, a 'K' number of adders 136-1 to 136-K, a 'K' number of Power Amplifiers (PA) 138-1 to 138-K, and an array antenna 140 having a 'K' number of signal radiation elements. The hybrid beamforming structure illustrated in FIG. 1 is merely one example, and its detailed construction can be variously implemented.

As illustrated in FIG. 1, the hybrid beamforming can be coupled with an OFDM transmission technique. Referring to FIG. 1, the RF beamformers 134-11 to 134-NK of a plurality of chains 120 can be connected to one physical array antenna 140 through the adders 136-1 to 136-K. In this case, different analog beams can be formed in the 'N' number of chains one by one, and an existing MIMO technique such as diversity, spatial multiplexing and the like can be performed on a baseband basis through the MIMO encoder 112 and the baseband precoder 114. Also, it is possible to limit the kind of precoding supported in the baseband precoder 114 and the kind of beams supported in the RF beamformers 134-11 to 134-NK, to the finite number in consideration of a transmission/reception feedback amount. At this time, the baseband precoder 114 can correspond to a codebook-based Preferred Matrix Index (PMI), and the RF beamformers 134-11 to 134-NK need a new feedback such as a beam index.

According to the structure of FIG. 1, the array antenna connected with the RF beamformer of each chain is identical. In detail, signals of different chains are analog beamformed by different RF beamformers, and beams generated by the different RF beamformers are summed up by antenna of the array antenna. Accordingly, a correlation of an effective channel of a baseband basis can be greatly increased in accordance to a beam coefficient of each RF beamformer. If the correlation is increased, this can make independent channel path forming difficult and deteriorate the performance of a MIMO transmission mode, particularly, a spatial multiplexing technique of transmitting data symbols different from each other by RF chain or a Multi-User (MU) MIMO technique of transmitting a data symbol to users different from each other by chain. In contrast, in a case of a diversity mode of transmitting the same data symbol by all chains, if a channel correlation increases, a diversity order can decrease, but a received Signal to Noise Ratio (SNR) gain can increase. Therefore, a suitable trade-off point can be selected in accordance to beam coefficient adjustment. In a case of a limited feedback environment, the beam coefficient adjustment can be achieved by selecting a specific beam among the finite number of beams. Accordingly, to address this problem, a method of selecting different beams in accordance to a MIMO mode is required.

Accordingly, the present disclosure proposes a way of beam selection considering a correlation of a beam in accordance to a MIMO transmission mode so as to improve the hybrid beamforming system performance in the limited feedback environment.

Assuming that an array antenna of an RF end is of a Uniform Linear Array (ULA) form and the RF beamformer is possible to adjust only a phase of a signal, an RF beamforming vector can be expressed as follows, and one phase value can correspond to one beam on a point-to-point basis.

$$W(\theta_{ij}^t) = \frac{1}{\sqrt{N_t}} \begin{bmatrix} 1 \\ e^{-j\frac{2\pi}{\lambda}d\sin\theta_{ij}^t} \\ e^{-j\frac{2\pi}{\lambda}2d\sin\theta_{ij}^t} \\ \vdots \\ e^{-j\frac{2\pi}{\lambda}(N_t-1)d\sin\theta_{ij}^t} \end{bmatrix} \quad (1)$$

where the $w(\theta_{ij}^t)$ denotes a $j^{th}$ RF beamforming vector of an $i^{th}$ RF chain of a transmitting end, the $N_t$ denotes the number of antennas of the transmitting end, and the $\theta_{ij}^t$ denotes a phase of a $j^{th}$ beam of the $i^{th}$ RF chain of the transmitting end. Here, the i has an integer value equal to or larger than '0' and equal to or less than $N_{RF}^t-1$, and the j has an integer value equal to or larger than '0' and equal to or less than $N_B^t(i)-1$. The $N_{RF}^t$ denotes the number of RF chains of the transmitting end, and the $N_B^t(i)$ denotes the number of beams workable in the $i^{th}$ RF chain of the transmitting end.

In a general wireless communication system, if a transmitting end transmits a receiving end a request for channel quality information for a specific MIMO mode, the receiving end feeds back at least one information among a Channel Quality Indicator (CQI), a Rank Indicator (RI), and a PMI, to the transmitting end. In a case of a hybrid beamforming system, information about an RF beam is more required. The receiving end can acquire channel information corresponding to all transmit beam combinations of the transmitting end, through a reference signal such as a midamble. Upon MIMO use, the receiving end can determine the optimum transmit beam combination by each RF chain and feed this back to the transmitting end. For example, the receiving end can transmit a Beam Index (BI) by RF chain to the transmitting end. At this time, a set of possible all beam combinations can be expressed as in Equation 2 below.

$$K = \left\{ \begin{array}{l} (\theta_{0j_0}^t, \theta_{1j_1}^t, \ldots, \theta_{(N_{RF}^t-1)j_{N_{RF}^t-1}}^t) \mid j_i = 0, 1, \ldots, N_B^t(i)-1, \\ i = 0, 1, \ldots, N_{RF}^t-1 \end{array} \right\} \quad (2)$$

where the K denotes a set of possible all beam combinations, the $\theta_{ij}^t$ denotes a phase of a $j_n^{th}$ beam of an $i^{th}$ RF chain of a transmitting end, the $N_{RF}^t$ denotes the number of RF chains of the transmitting end, and the $N_B^t(i)$ denotes the number of beams workable in the $i^{th}$ RF chain of the transmitting end.

The number of elements included in the set of possible all beam combinations, i.e., the number of beam combinations can be expressed as in Equation 3 below.

$$|K| = \prod_{i=0}^{N_{RF}^t-1} N_B^t(i) \quad (3)$$

where the $|K|$ denotes the number of elements included in a set of possible all beam combinations, the $N_{RF}^t$ denotes the number of RF chains of a transmitting end, and the $N_B^t(i)$ denotes the number of beams workable in an $i^{th}$ RF chain of the transmitting end.

A correlation between two beams of arbitrary two transmission RF chains can be defined as in Equation 4 below.

$$\rho_{rs}^{pq} = |w(\theta_{pr}^t)^H w(\theta_{qs}^t)| \quad (4)$$

where the $\rho_{rs}^{pq}$ denotes a correlation between an $r^{th}$ RF beam of a $p^{th}$ RF chain and an $s^{th}$ RF beam of a $q^{th}$ RF chain, the $w(\theta_{pr}^t)$ denotes an $r^{th}$ RF beamforming vector of the $p^{th}$ RF chain of a transmitting end, the $w(\theta_{qs}^t)$ denotes an $s^{th}$ RF beamforming vector of the $q^{th}$ RF chain of the transmitting end, and the H is Hermitian and denotes a complex conjugate and transpose.

If the RF beamforming vector is normalized as in Equation 1 above, the correlation $\rho_{rs}^{pq}$ can have a value between '0' and '1'. The correlation $\rho_{rs}^{pq}$ between the two beams is high as getting close to '1'. In an extreme example, if the two beams have the same phase, the correlation is equal to '1' and, if two beams have orthogonal phases, the correlation is equal to '0'.

The present disclosure defines a suitable correlation threshold by MIMO mode and, when determining a transmit beam combination, excludes from a search object a candidate of a combination having a correlation exceeding the threshold among a $|K|$ number of candidates of Equation 3 above. However, correlation thresholds for some MIMO modes can be identical.

In a case where the beam numbers $N_B^t(i)$ are all different by chain and the phases $\theta_{ij}^t$ of beams are all different, an example of an algorithm of determining a beam combination is given as in Table 1 below.

TABLE 1

| | |
|---|---|
| 1 | Initialization |
| | A  K' = ϕ |
| | B  Set a threshold $\rho_{th}$ in accordance with the given MIMO mode |
| 2 | For k: 0 to $|K|-1$ |

TABLE 1-continued

| | |
|---|---|
| A | $k^{th}$ candidate: $\left(\theta^t_{0j_0}, \theta^t_{1j_1}, \ldots, \theta^t_{(N^t_{RF}-1)j_{(N^t_{RF}-1)}}\right)$, set with flag f = 1. |
| B | For all combinations of two beams $\theta^t_{pr}$ and $\theta^t_{qs}$ within $\left(\theta^t_{0j_0}, \theta^t_{1j_1}, \ldots, \theta^t_{(N^t_{RF}-1)j_{(N^t_{RF}-1)}}\right)$, $\left(\text{Total number of combinations} = \binom{N^t_{RF}}{2}\right)$ |
| | i   If $\rho^{pq}_{rs} > \rho_{th}$, setting with f = 0, and break loop B. |
| C | If f = 1, K' ← K' ∪ $\left\{\left(\theta^t_{0j_0}, \theta^t_{1j_1}, \ldots, \theta^t_{(N^t_{RF}-1)j_{(N^t_{RF}-1)}}\right)\right\}$ |
| 3 | Storing K' in a memory. |
| 4 | After receiving reference signal, select an optimum candidate in K' in accordance to a given metric. |

In Table 1 above, in a case of step 4, a criterion of finding the optimum beam combination can be defined as a combination of one or two of effective SINR maximization, mutual information (capacity) maximization, and minimum SNR maximization.

That is, as in Table 1 above, each subset is defined such that correlations of all pair of two-beams among beams belonging to the subset are equal to or are less than the threshold. Here, the threshold is desirably defined such that a variation of the number of transmit beams included in subsets is not excessively large. For the sake of the same result, an algorithm different from Table 1 above can be used.

Considering a complexity of implementation of an RF beamformer and an efficiency of BI feedback thereof, an exemplary embodiment of using the same number of beams in all RF chains of a transmitting end and identically setting even phases of beams by each chain is possible as well. That is, it can be set like $N^t_B(0)=N^t_B(1)=\ldots=N^t_B(N^{t-1}_{RF})=N^t_B$, $$\theta^t_{0j} = \theta^t_{1j} = \ldots = \theta^t_{(N^t_{RF}-1)j} = \theta^t_j.$$

In this case, one given transmit beam set $$\Theta^t = \left\{\theta^t_0, \theta^t_1, \ldots, \theta^t_{(N^t_B-1)}\right\}$$

can be classified into a few subsets in accordance to a correlation basis. In this case, an example of an algorithm of determining a beam combination is given as in Table 2 below.

TABLE 2

| | |
|---|---|
| 1 | Initialization |
| A | $\Theta^t = \left\{\theta^t_0, \theta^t_1, \ldots, \theta^t_{(N^t_B-1)}\right\}$ |
| B | Set a threshold $\rho_{th}$ in accordance with given MIMO mode |
| C | i ← 0 |
| 2 | Performing A to D below during $\Theta^t \neq \phi$ |
| A | Create new subset $\Theta_i$ and select a specific $\theta^t_c$ ($\theta^t_c \notin \Theta^t$) |
| B | Set $\Theta_i = \{\theta^t_c\}$, and $\Theta^t = \Theta^t - \{\theta^t_c\}$ |
| C | If $\Theta^t \neq \phi$, perform i and ii below during $\Theta^t \neq \phi$. |
| | i   Select a certain $\theta^t_d$ ($\theta^t_d \in \Theta^t$) |
| | ii  If $\rho_{cd} < \rho_{th}$, $\Theta_i = \Theta_i \cup \{\theta^t_d\}$ and $\Theta^t = \Theta^t - \{\theta^t_d\}$ |
| D | i ← i + 1 |
| 3 | Store all $\Theta_i$ in a memory. |
| 4 | After receiving a reference signal, search an optimum candidate in each $\Theta_i$ in accordance to a given metric, and again select an optimum candidate among searched candidates. |

That is, as in Table 2 above, each subset is defined such that correlations of all pair of two-beams among beams belonging to the subset are equal to or are less than the threshold. For the sake of the same result, an algorithm different from Table 2 above can be used.

The aforementioned exemplary embodiment for determination of the subset has been described on the basis of the hybrid beamforming structure of FIG. 1. Unlike FIG. 1, a hybrid beamforming structure of FIG. 2 or FIG. 3 below can be used in accordance with another exemplary embodiment of the present disclosure.

Figure 2:
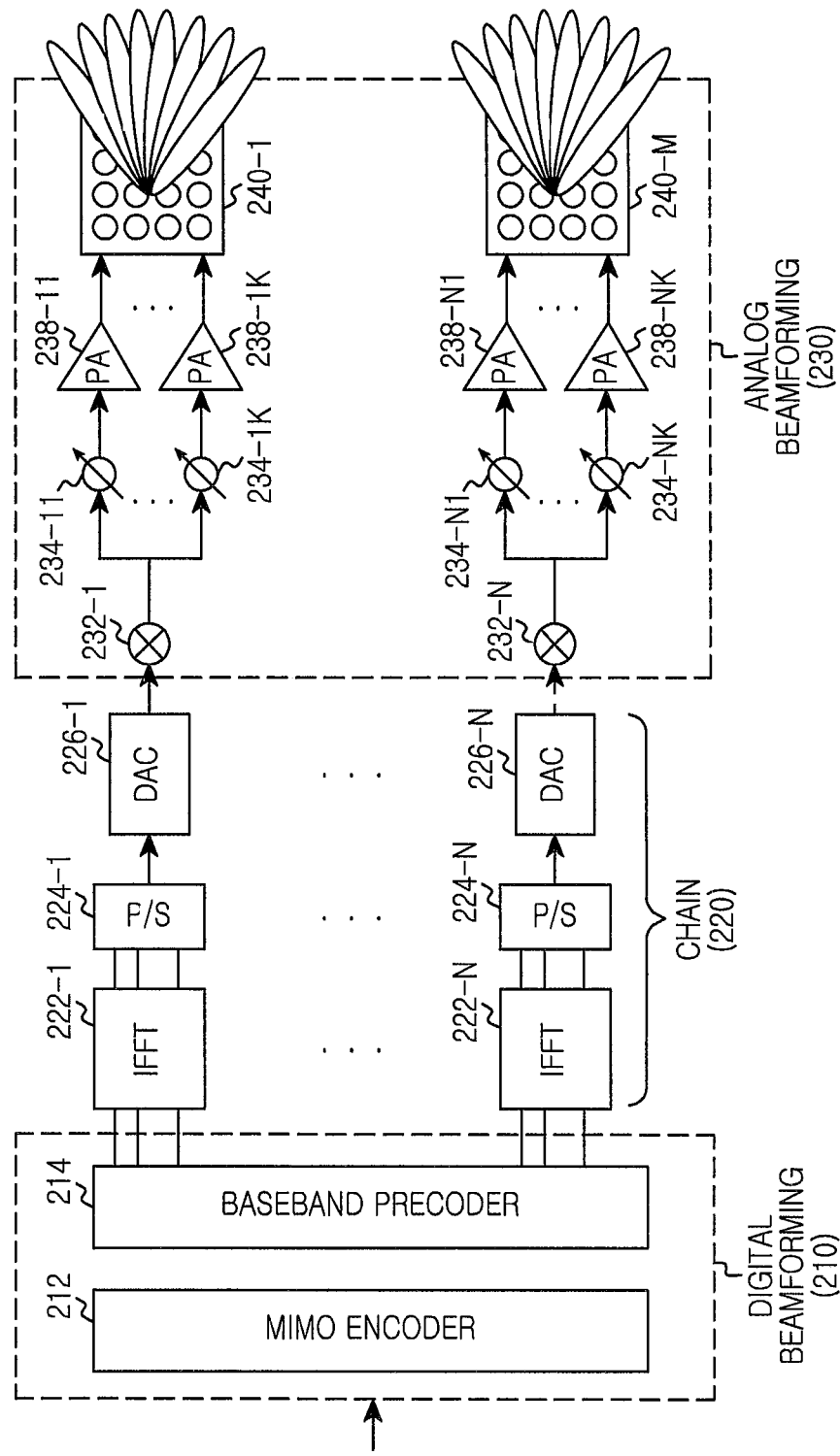
FIG. 2 illustrates a hybrid beamforming structure according to another embodiment of the present disclosure.

FIG. 2 illustrates a hybrid beamforming structure according with another exemplary embodiment of the present disclosure. FIG. 2 exemplifies a structure in which a digital path is connected with one sub array antenna.

Referring to FIG. 2, the hybrid beamforming is performed through a digital beamforming block 210, a chain block 220, and an analog beamforming block 230. In detail, the digital beamforming block 210 includes a MIMO encoder 212 and a baseband precoder 214. The chain block 220 includes an 'N' number of chains. Each chain includes an IFFT block 222, a P/S block 224, and a DAC 226. The analog beamforming block 230 includes an 'N' number of mixers 232-1 to 232-N, RF beamformers 234-11 to 234-NK composed of an (N×K) number of phase and magnitude conversion elements, a 'K' number of PAs 238-1 to 238-K, and sub array antennas 240-1 to 240-M having a 'K' number of signal radiation elements. In the beamforming structure of FIG. 2, the RF chains within the chain block 220(230→220) each have the independent sub array antenna 240.

Figure 3:
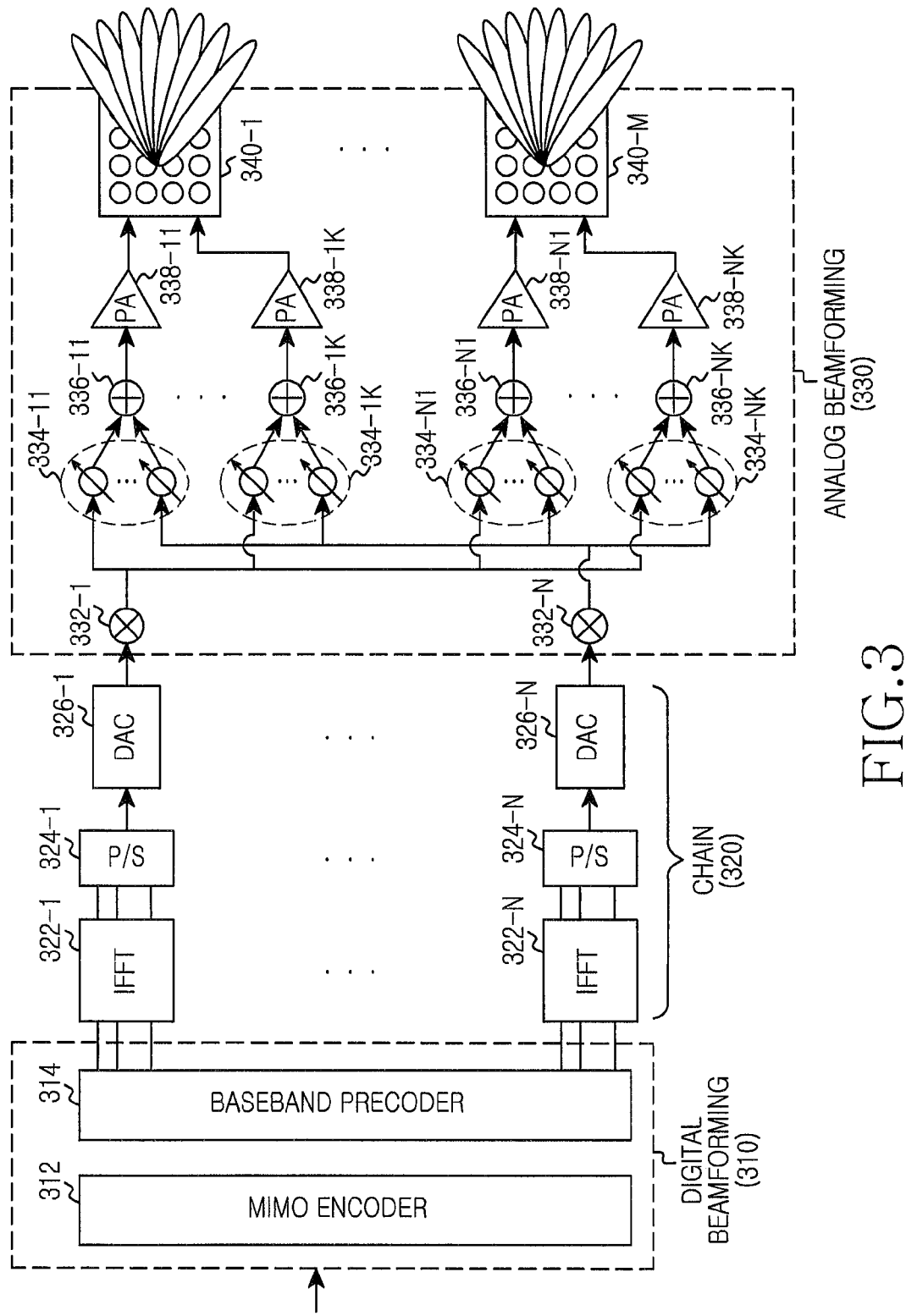
FIG. 3 illustrates a hybrid beamforming structure according to a further embodiment of the present disclosure.

FIG. 3 illustrates a hybrid beamforming structure according to a further exemplary embodiment of the present disclosure. FIG. 3 exemplifies a structure in which each digital path is connected with all sub array antennas.

Referring to FIG. 3, the hybrid beamforming is performed through a digital beamforming block 310, a chain block 320, and an analog beamforming block 330. In detail, the digital beamforming block 310 includes a MIMO encoder 312 and a baseband precoder 314. The chain block 320 includes an 'N' number of chains. Each chain includes an IFFT block 322, a P/S block 324, and a DAC 326. The analog beamforming block 330 includes an 'N' number of mixers 332-1 to 332-N, RF beamformer subsets 334-11 to 334-NK composed of an (N×K) number of phase and magnitude conversion elements, a 'K' number of adders 336-1 to 336-K, a 'K' number of PAs 338-1 to 338-K, and sub array antennas 340-1 to 340-M having a 'K' number of signal radiation elements.

The structure of FIG. 3 is an example of a general structure capable of supporting all of the structures of FIG. 1 and FIG. 2. For example, if the structure of FIG. 3 uses only one antenna, it can be a structure similar to FIG. 1. Also, in the structure of FIG. 3, after the number of RF chains and the number of antennas are made identical, if a non-zero beamforming coefficient is applied only to a mutually corresponding path and a zero (0) coefficient is applied to the remnant, it can be a structure similar to FIG. 2. Here, applying of the zero (0) coefficient includes disconnecting.

In a case of the hybrid beamforming structure of FIG. 3, beamforming vectors can be expressed as in Equation 5 below.

$$W_{RF1} = \begin{bmatrix} \vec{w}_{11} \\ \vec{w}_{21} \\ \vec{w}_{31} \end{bmatrix}, W_{RF2} = \begin{bmatrix} \vec{w}_{21} \\ \vec{w}_{22} \\ \vec{w}_{32} \end{bmatrix} \quad (5)$$

where the $w_{RFn}$ denotes beamforming vectors for an $n^{th}$ RF chain, and the $\vec{w}_{nm}$ denotes a beamforming vector corresponding to the $n^{th}$ RF chain and an $m^{th}$ sub array antenna.

Equation 5 above exemplifies the beamforming vectors of a case where the number of RF chains is equal to '2' and the number of sub array antennas is equal to '3'. In this case, a correlation between the beamforming vectors can be determined as in Equation 6 below.

$$\rho = |w_{RF\,1}{}^H w_{RF\,2}| = |\vec{w}_{11}{}^H \vec{w}_{21} + \vec{w}_{21}{}^H \vec{w}_{22} + \vec{w}_{31}{}^H \vec{w}_{32}| \neq 0 \quad (6)$$

where the $\rho$ denotes a correlation between beamforming vectors, the $w_{RFn}$ denotes beamforming vectors for an $n^{th}$ RF chain, and the $\vec{w}_{nm}$ denotes a beamforming vector corresponding to the $n^{th}$ RF chain and an $m^{th}$ sub array antenna.

If the finite number of beam sets are defined by each sub array, after the total beamforming vectors are constructed similarly to Equation 5 above by combining beams by sub array antenna with each other, subsets can be determined on a correlation basis in accordance with the aforementioned method.

The RF beamforming vector of Equation 1 above can be generalized as in Equation 7 below.

$$W_{RF1} = \begin{bmatrix} \vec{W}_{11} \\ \vec{W}_{21} \\ \vdots \\ \vec{W}_{N_t^{sa}1} \end{bmatrix} \quad (7)$$

where the $W_{RFn}$ denotes beamforming vectors for an $n^{th}$ RF chain, the $\vec{W}_{nm}$ denotes a beamforming vector corresponding to the $n^{th}$ RF chain and an $m^{th}$ sub array antenna, and the $N_t^{sa}$ denotes the number of sub array antennas.

Each $\vec{W}_{nm}$ given in Equation 7 above corresponds to the beamforming vector expressed in Equation 1 above. In Equation 7 above, if $N_t^{sa}$ is equal to '1', the beamforming vector applied to the beamforming structure of FIG. 1 is constructed.

Also, the $N_B{}^t(i)$ of Equation 2 above and Equation 3 above can be defined as in Equation 8 below.

$$N_B^t(i) = N_B^{SA1} \times N_B^{SA2} \times \ldots \times N_B^{SAN_t^{sa}} \quad (8)$$

where the $N_B{}^t$ (i denotes the number of beams workable in an $i^{th}$ RF chain of a transmitting end, the $N_B{}^{SAm}$ denotes the number of beams workable in an $m^{th}$ sub array antenna, and the $N_t^{sa}$ denotes the number of sub array antennas.

That is, referring to Equation 8 above, the number of beams workable in the $i^{th}$ RF chain is expressed as a multiplication of the numbers of beams by sub array antenna. Accordingly, in a case of the hybrid beamforming structure of FIG. 1, the $N_t^{sa}$ is equal to '1'.

As described above, subsets of beams are determined in accordance to a correlation between the beams. In detail, at least one subset composed of beams having a correlation less than a threshold is determined in accordance with an algorithm of Table 1 above or Table 2 above. At this time, different subsets can be constructed by MIMO mode. In other words, the whole beams are classified into at least one subset. At this time, different subset classifying can be determined in accordance with the MIMO mode. For example, when specific two beams 'b1' and 'b2' exist, in a case of a spatial multiplexing mode, the beams 'b1' and 'b2' can belong to the same subset but, in a case of a diversity mode, the beams 'b1' and 'b2' can belong to different subsets.

The at least one subset can be determined for transmit beams of a Base Station (BS) or can be determined for receive beams of the BS. In this case, the at least one subset is determined considering a hardware characteristic of the BS such as RF chains, an array antenna, and the like. Also, the at least one subset can be determined for transmit beams of a terminal or can be determined for receive beams of the terminal. In this case, the at least one subset is determined considering a hardware characteristic of the terminal such as RF chains, an array antenna, and the like. Accordingly, the subset can be determined and be previously stored in a manufacturing process of the BS and the terminal.

If using the subset of the beams, the BS and the terminal can perform beam selection considering a correlation. For example, if operating in a MIMO mode of the best performance as a correlation between beams decreases, the BS and the terminal can use a combination of beams within the same subset within a certain time resource or frequency resource range. In contrast, if operating in the MIMO mode of the best performance as the correlation between the beams increases, the BS and the terminal can use a combination of beams within different subsets within a certain time resource or frequency resource range.

The subset can correspond to a frame or a subframe. For example, the BS can support only beams of the same subset within a specific subframe. That is, the BS can limit workable beams every subframe. At this time, a criterion of selection of used beams can be the subset.

In accordance with an exemplary embodiment of the present disclosure, the BS and the terminal can use the subset as above even without sharing subset information about their own beams. For example, if a transmit beam for transmit beamforming is selected by a transmitting end, although the transmitting end does not provide subset information about transmit beams of the transmitting end to a receiving end, the transmitting end can select a plurality of beams in consideration of a subset. In contrast, although the selection of the transmit beam for the transmit beamforming is performed by the received end, if an analog beam set of the transmitting end has been previously determined, the receiving end can determine a correlation of the transmit beams of the transmitting end without separate signaling of the transmitting end. In accordance with this, the receiving end can determine a subset by MIMO mode of the transmitting end on the basis of the determined correlation, and store the determined subset in a memory. Later, if the BS requests a BI and PMI feedback for a specific MIMO mode for the sake of downlink transmission, the receiving end can use its own determining subset information.

In accordance with another exemplary embodiment of the present disclosure, for the sake of the aforementioned subset use, the transmitting end and the receiving end have to share subset information. For example, in a case where an analog beam set of the transmitting end has not been previously determined, for example, in a case where subset information of the transmitting end should be notified to the receiving end because the analog beam set of the transmitting end can be different depending on manufacturing companies, the subset information can be exchanged through signaling, for example. In detail, information for identifying at least one subset and information for identifying beams included in each subset can be forwarded through the signaling. Additionally, beam vectors including beam coefficients of the beams can be forwarded. Here, the beam coefficient can be expressed as a combination of a magnitude and a phase.

Figure 4:
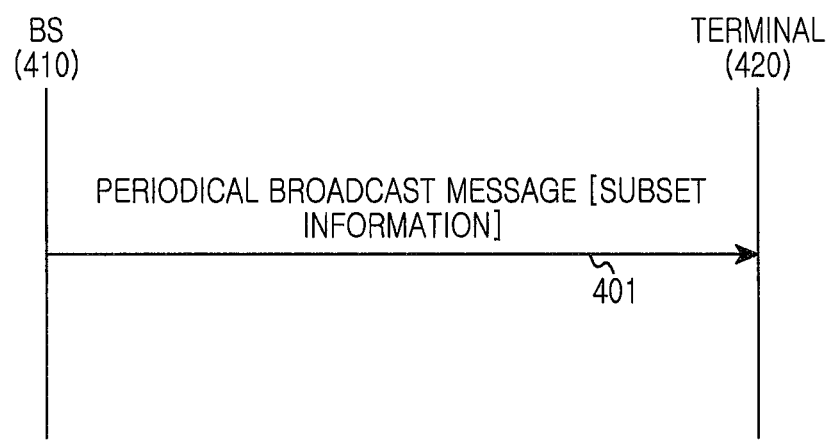
FIGS. 4 to 8 illustrate examples of transmission of subset information in a wireless communication system according to an embodiment of the present disclosure.
Figure 5:
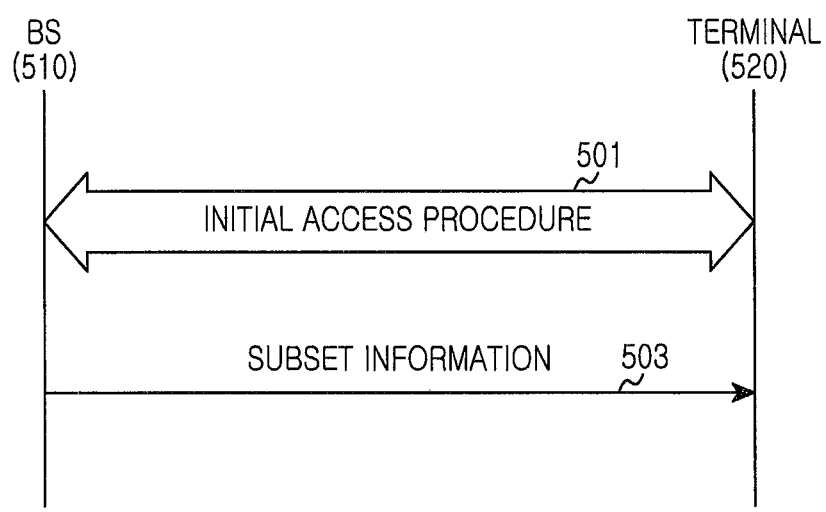
Figure 6:
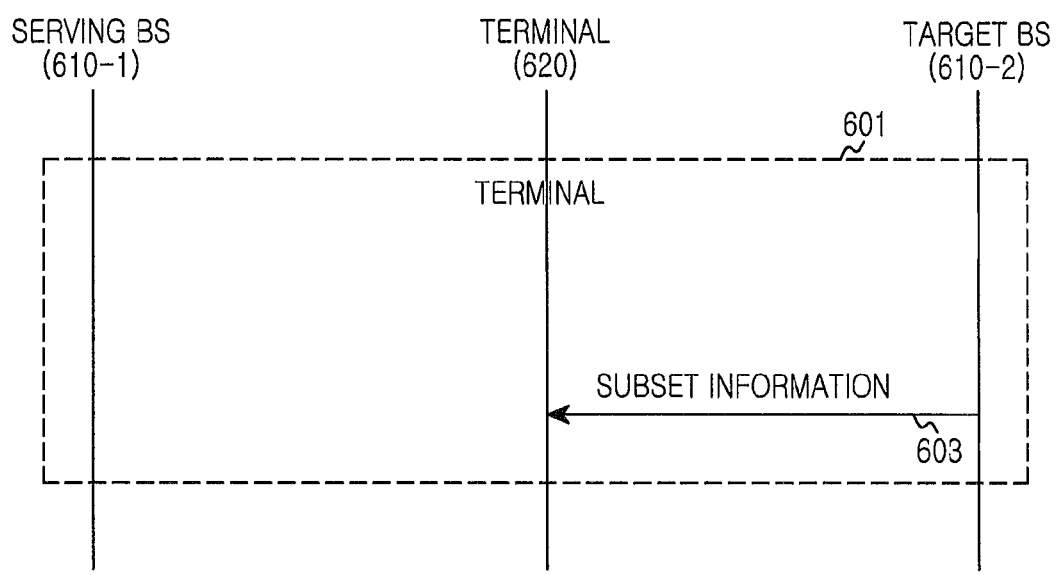

If the transmitting end is a BS, the subset information can be transmitted as follows. For example, the BS can periodically transmit the subset information through a broadcast channel. Referring to FIG. 4, in step 401, a BS 410 transmits a terminal 420 a periodical broadcast message including subset information. Here, the broadcast message can be system information. For another example, after the terminal 420 performs initial access at a time when power turns on, the BS 410 can transmit the subset information to the terminal 420. Referring to FIG. 5, in step 501, a BS 510 and a terminal 520 perform an initial access procedure. After the initial access procedure, in step 503, the BS 510 transmits the subset information to the terminal 520. However, unlike FIG. 5, the transmission of the subset information can be included as a part of the initial access procedure. For another example, the BS 510 can include the subset information in system information which is transmitted in a process of entering a target BS upon handoff. Referring to FIG. 6, in step 601, a serving BS 610-1, a target BS 610-2, and a terminal 620 perform a handover procedure of the terminal 620. During the handover procedure, in step 603, the target BS 610-2 transmits the subset information to the terminal 620. In a case of transmitting the subset information by terminal, for example, in a case of FIG. 5 and FIG. 6, the BS can identify a MIMO mode workable in the terminal, and transmit the subset information only in the MIMO mode workable in the terminal.

Figure 7:
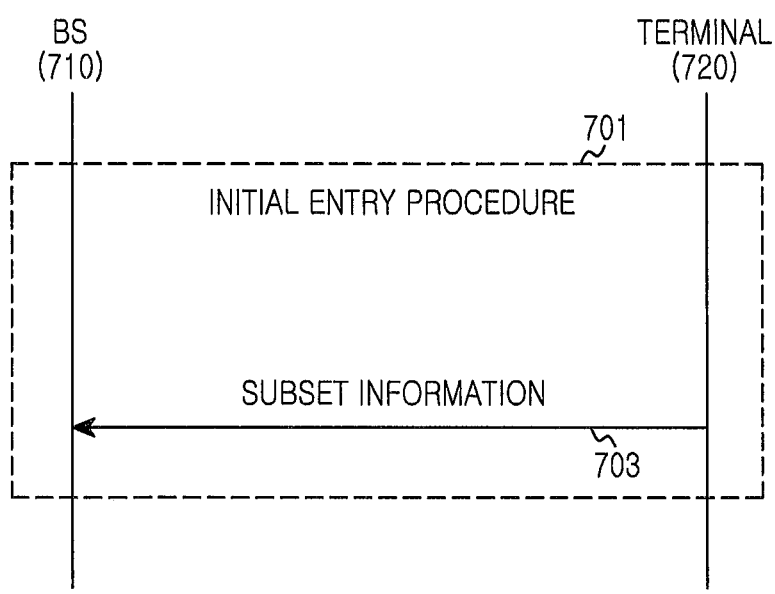
Figure 8:
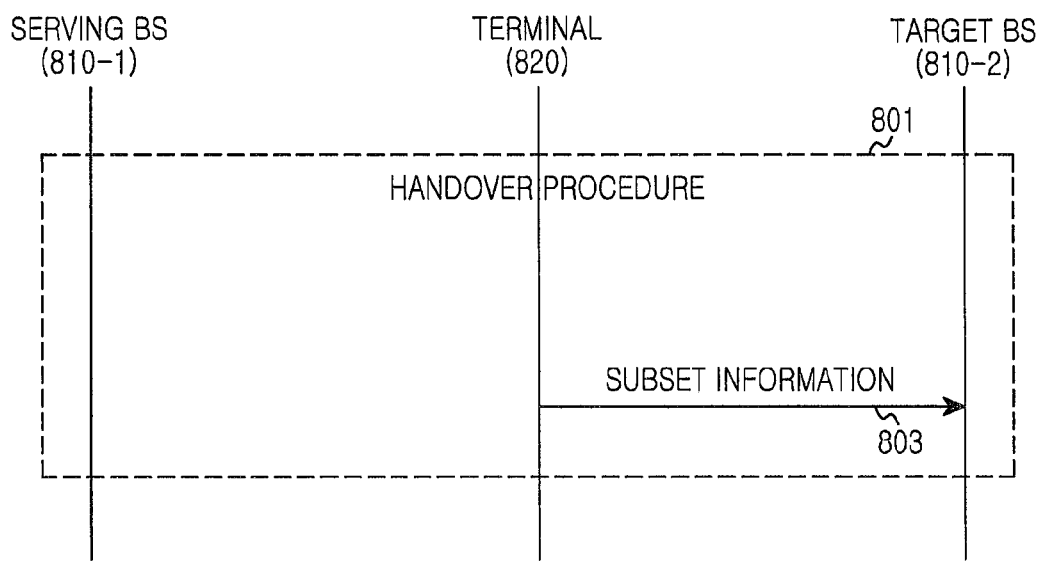

If the transmitting end is a terminal, in other words, if the terminal transmits a multiple beam to a BS in uplink, the subset information can be transmitted as follows. If each terminal is given a duration capable of individually transmitting a reference signal of its own beam, after the terminal enters the BS and forms a transmission channel, the terminal can transmit the subset information to the BS. For example, the terminal can transmit the subset information to the BS through an initial entry procedure. Referring to FIG. 7, in step 701, a terminal 720 and a BS 710 perform an initial entry procedure. At this time, during the initial entry procedure, in step 703, the terminal 720 transmits the subset information to the BS 710. For another example, the terminal 720 can transmit the subset information to the BS 710 in a process of exchanging system information upon handover. Referring to FIG. 8, in step 801, a serving BS 810-1, a target BS 810-2, and a terminal 820 perform a handover procedure of the terminal 820.

During the handover procedure, in step 803, the terminal 820 transmits the subset information to the target BS 810-2. After that, if the target BS 810-2 receives an uplink data transmission request from the terminal 820, the target BS 810-2 can allocate a sounding channel to the terminal 820, receive a beam reference signal, select the optimum beam and codebook combination on the basis of previously stored subset information, and transmit information notifying the optimum beam and codebook combination, to the terminal 820, together with uplink resource allocation information. In accordance with this, the terminal 820 performs multiple beam transmission using the optimum beam and codebook combination which are selected on the basis of the subset information.

In a case where the subset information is signaled, a detailed form of the subset information can be variously constructed. For example, the subset information can be constructed as in FIGS. 9A and 9B.

FIGS. 9A and 9B illustrate examples of constructions of subset information in a wireless communication system according to an exemplary embodiment of the present disclosure. In FIG. 9A illustrates an exemplary embodiment including beam coefficients, and 9B illustrates an exemplary embodiment including a classifying result.

Referring to FIG. 9A, a transmitting end can notify an analog beam coefficient to a receiving end such that the receiving end can determine a subset by itself in accordance with an exemplary embodiment of the present disclosure. For example, the transmitting end can forward a magnitude and phase value itself constituting the beam coefficient to the receiving end. For another example, when the transmitting end uses a ULA or a Uniform Planar Array (UPA) of Equation 1 above, the transmitting end can encode and transmit only a steering angle value to the receiving end, because it is possible to correspond a beamforming vector to one or more steering angle values on a point-to-point basis. Here, when the steering angle is one in number, it can be defined as the ULA and, when the steering angle is two in number, it can be defined as the UPA. For example, in a case where the transmitting end is composed of a ULA capable of using eight beams by chain, information that the transmitting end will have to provide to the receiving end are eight steering angle values corresponding to the each of beams, and the number of bits necessary for encoding the eight steering angle values can be varied in accordance with a required accuracy. For example, assuming that the steering angle is expressed at an interval 10° from −60° to 60% thirteen levels are required. Therefore, four bits (i.e., sixteen levels) per one beam are needed.

Referring to FIG. 9B, the transmitting end can notify information for identifying a subset and information for identifying beams included in the subset in accordance with another exemplary embodiment of the present disclosure. In this case, the number of subsets and the number of beams within the subset can be varied by MIMO mode, so the information for identifying the subset and the information for identifying beams are encoded such that the MIMO mode, the number of subsets, and the number of beams can be all distinguished. Generally, because the number of beams workable in the transmitting end is affected by a pattern of a reference signal such as a midamble and a sounding signal, the number of the workable beams can be fixed. Also, if a restriction of having to encode corresponding information by the same bit number is given, the subset information can be encoded in a form of {MIMO mode index}-{subset index by beam}. For example, the subset information can be expressed by nine bits $(m_0 m_1 m_2 m_3 m_4 m_5 m_6 m_7 m_8)$, when the kind of subsets is two MIMO modes such as diversity and spatial multiplexing, and the kind of subset is equal to maximum '2', and the number of beams of the transmitting end is equal to '8'. Here, the bit $(m_o)$ is a MIMO mode identifier, and the remnant eight bits $(m_1$ to $m_8)$, which are a bitmap, can be a subset identifier to which each beam belongs. As a concrete example, if the bit $(m_0)$ is equal to '0', this can signify the diversity and, if the bit $(m_0)$ is equal to '1', this can signify the spatial multiplexing. If the eight bits $(m_1$ to $m_8)$ are equal to '01010101', this can represent that beams 1, 3, 5, and 7 belong to a subset 0 and beams 2, 4, 6, and 8 belong to a subset 1.

Figure 10:
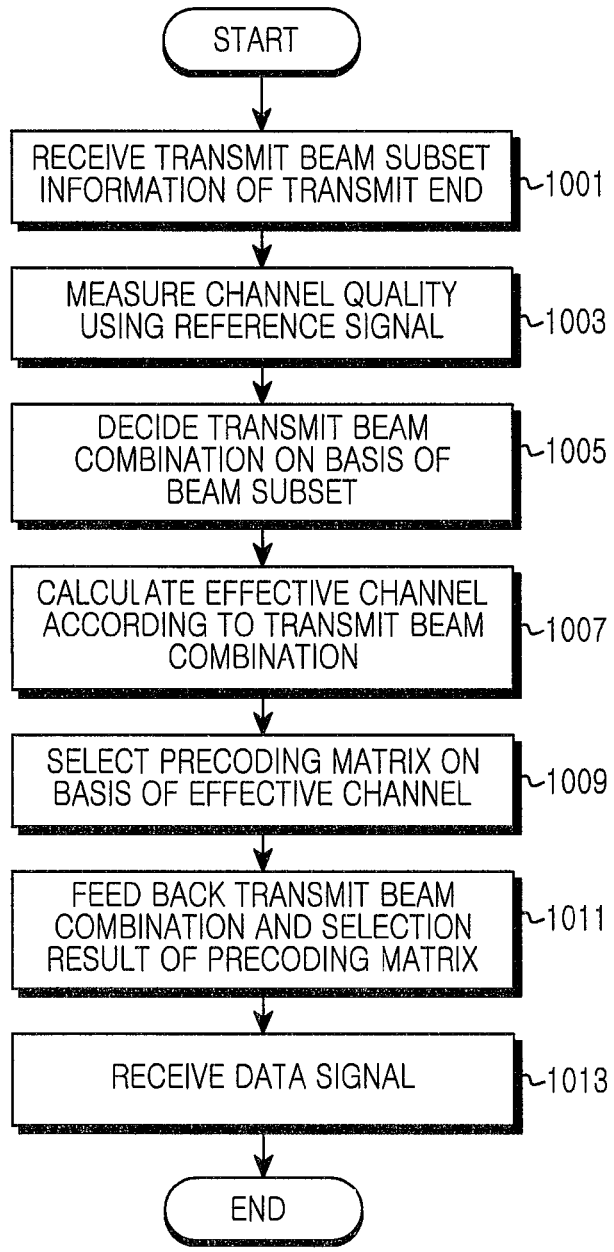
FIG. 10 illustrates an operation procedure of a receiving end in a wireless communication system according to an embodiment of the present disclosure.

FIG. 10 illustrates an operation procedure of a receiving end in a wireless communication system according to an exemplary embodiment of the present disclosure.

Referring to FIG. 10, in step 1001, the receiving end receives transmit beam subset information of a transmitting end, from the transmitting end. The subset information includes one of information representing a result of classifying analog transmit beams of the transmitting end into at least one subset and information used to determine the subset. For example, if the receiving end is a terminal, the receiving end can receive the subset information during an initial access process of the receiving end, or receive the subset information soon after the initial access of the receiving end, or acquire the subset information from system information broadcasted by a BS, or receive the subset information during a handover procedure of the receiving end. For another example, if the receiving end is a BS, the receiving end can receive the subset information during an initial access process of the transmitting end, or receive the subset information soon after the initial access of the transmitting end, or receive the subset information during a handover procedure of the transmitting end.

After receiving the subset information, the receiving end proceeds to step 1003 and measures a channel quality using a reference signal transmitted by the transmitting end. In detail, the reference signal can be a preamble, a midamble, a synchronization signal, a pilot signal, and the like. Also, the channel quality can be a Received Signal Strength (RSS). For another example, the channel quality can be one of a Signal to Interference and Noise Ratio (SINR), a Signal and Noise Ratio (SNR), and a Carrier to Interference and Noise Ratio (CINR). Here, the receiving end measures the channel quality by transmit beam of the transmitting end. That is, the reference signal is beamformed to each transmit beam and is repeatedly transmitted by the transmitting end. In other words, as many reference signals as the number of transmit beams can be transmitted.

After that, the receiving end proceeds to step 1005 and determines a transmit beam combination which will be applied to a data signal, on the basis of the beam subset information of the transmitting end. At this time, the receiving end determines the transmit beam combination by selecting a plurality of beams in accordance with a criterion considering a MIMO mode which will be applied. A detailed process of determining the transmit beam combination can be varied in accordance with an exemplary embodiment of the present disclosure. Below, the present disclosure describes exemplary embodiments of determining the transmit beam combination with reference to FIG. 12 below to FIG. 15 below.

After determining the transmit beam combination, the receiving end proceeds to step 1007 and calculates an effective channel according to the transmit beam combination. At this time, the receiving end can calculate the effective channel for each of a plurality of beam combinations selected for different MIMO modes. In other words, the receiving end can determine the effective channel by MIMO mode. The effective channel being expressed by a multiplication of an actual channel and a beam coefficient represents a channel considering the affection of analog beamforming. However, to calculate the effective channel for transmitting data, the receiving end not necessarily knows the beam coefficient. For example, the effective channel can be calculated by a combination of channel values which are estimated through the reference signal that is applied in the beamforming process.

After calculating the effective channel, the receiving end proceeds to step 1009 and selects a precoding matrix on the basis of the effective channel. The precoding matrix, a matrix representing beam coefficients for digital beamforming, can be identified by a PMI. For example, the receiving end can select the precoding matrix in accordance with the MIMO mode. Here, the MIMO mode can be one of a diversity mode and a spatial multiplexing mode.

After selecting the precoding matrix, the receiving end proceeds to step 1011 and feeds back the transmit beam combination and the selection result of the precoding matrix, to the transmitting end. The selection result can include analog beam indexes indicating beams included in the transmit beam combination and a digital beam index (e.g., PMI) indicating the precoding matrix. In accordance with another exemplary embodiment of the present disclosure, the receiving end can feed back transmit beam combinations for a plurality of MIMO modes and effective channels for the transmit beam combinations, to the transmitting end. In this case, the MIMO mode to be executed can be determined by the transmitting end.

Next, the receiving end proceeds to step 1013 and receives a data signal. The data signal is transmitted after being digital beamformed and analog beamformed by the transmitting end. At this time, the digital beamforming is achieved by the precoding matrix fed back in step 1011 and the analog beamforming is achieved by the transmit beam combination fed back in step 1011.

Figure 11:
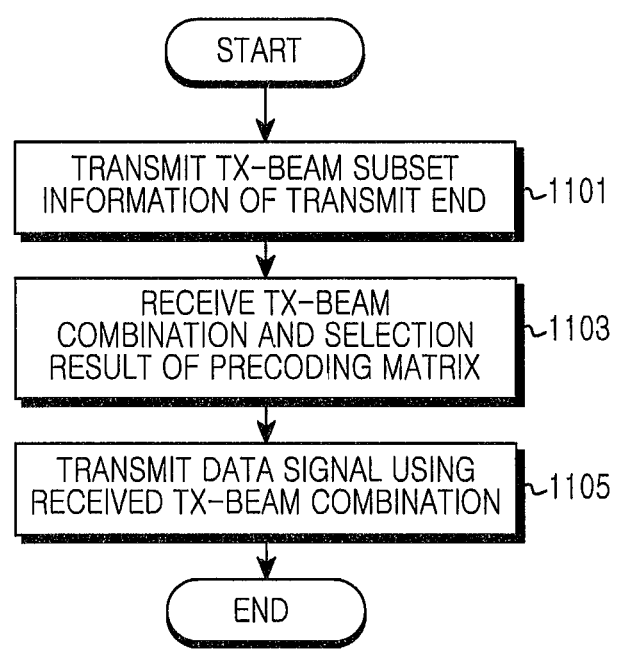
FIG. 11 illustrates an operation procedure of a transmitting end in a wireless communication system according to an embodiment of the present disclosure.

FIG. 11 illustrates an operation procedure of a transmitting end in a wireless communication system according to an exemplary embodiment of the present disclosure.

Referring to FIG. 11, in step 1101, the transmitting end transmits transmit beam subset information of the transmitting end, to a receiving end. The subset information can include one of information representing a result of classifying analog transmit beams of the transmitting end into at least one subset and information used to determine the subset.

For example, if the receiving end is a terminal, the transmitting end can transmit the subset information during an initial access process of the receiving end, or transmit the subset information soon after the initial access of the receiving end, or transmit the subset information through system information broadcasted by a BS, or transmit the subset information during a handover procedure of the receiving end.

For another example, if the receiving end is a BS, the receiving end can receive the subset information during an initial access process of the transmitting end, or receive the subset information soon after the initial access of the transmitting end, or receive the subset information during a handover procedure of the transmitting end.

After that, in step 1103, the transmitting end receives a transmit beam combination and a selection result of a precoding matrix from the receiving end. The selection result can include analog beam indexes indicating beams included in the transmit beam combination and a digital beam index (e.g., PMI) indicating the precoding matrix.

Next, the transmitting end proceeds to step 1105 and transmits a data signal. In detail, the transmitting end modulates data which will be transmitted to the receiving end and, after digital beamforming and analog beamforming, the transmitting end transmits beamformed signals. At this time, the digital beamforming is achieved by the precoding matrix fed back in step 1103 and the analog beamforming is achieved by the transmit beam combination fed back in step 1103.

As described above, the receiving end determines a transmit beam combination which will be used for data transmission on the basis of a transmit beam subset of the transmitting end. At this time, the transmit beam combination can be determined by a different criterion in accordance with a MIMO mode. The determining of the transmit beam combination according to the MIMO mode is briefly described as follows.

For example, the whole transmit beam set B of the transmitting end can be {b0, b1, b2, b3, b4, b5, b6, b7, b8, b9, b10, b11, b12, b13, b14, b15}. Here, B1 and B2 denote transmit beam subsets. The subset B1 can be defined as {b0, b2, b4, b6; b8, b10, b12, b14}, and the subset B2 can be defined as {b1, b3, b5, b7, b9, b11, b13, b15}.

When the MIMO mode is a diversity mode, the transmit beam combination can be determined by selecting one beam having the maximum received signal strength in each subset. In detail, when it is 2×1 diversity, the receiving end includes in the beam combination one beam having the maximum received signal strength in the subset B1 and one beam having the maximum received signal strength in the subset B2. This is because, in a case of the diversity mode, an SNR gain has a greater influence on performance than a diversity order. For another example, when the MIMO mode is the diversity mode, the transmit beam combination can be determined considering a correlation between beams regardless of the subset. In detail, when it is 2×1 diversity, the receiving end can select the two beams having the greatest received signal strengths regardless of the correlation, after arranging beam indexes in descending order on a basis of a received signal strength in the whole transmit beam set B.

When the MIMO mode is a spatial multiplexing mode, the transmit beam combination can be determined, by selecting a subset having the greatest received signal strength sum after selecting beams of the required number having high received signal strengths. In detail, when it is 2×2 spatial multiplexing, after the receiving end determines two beams having high received signal strengths in a subset B1 and two beams having high received signal strengths in a subset B2, the receiving end includes in the beam combination the two beams determined in the subset B1 or B2 having a higher received signal strength sum among the subset B1 and the subset B2. This is because, in a case of the spatial multiplexing mode, decreasing a correlation of an effective channel has a greater influence on performance. For another example, when the MIMO mode is the diversity mode, the transmit beam combination can be determined considering a correlation between beams regardless of the subset. In detail, when it is 2×2 spatial multiplexing, the receiving end can select a 1st beam having the maximum received signal strength, after arranging beam indexes in descending order on a basis of a received signal strength in the whole transmit beam set B. And, if a correlation between the $1^{st}$ beam and a $2^{nd}$ beam is less than a threshold, the receiving end selects the $2^{nd}$ beam. If the correlation is equal to or is greater than the threshold, the receiving end compares the $1^{st}$ beam with a $3^{rd}$ beam. By repeating this, the receiving end selects two beams.

Below, the present disclosure describes exemplary embodiments of the aforementioned determining of the transmit beam combination in detail with reference to FIGS. 12 to 15. In FIGS. 12 to 15, the receiving end selects beams on the basis of a received signal strength. But, the received signal strength is merely one example of a channel quality, and the received signal strength can be replaced with other metrics such as a SINR, a CINR, a SNR and the like.

Figure 12:
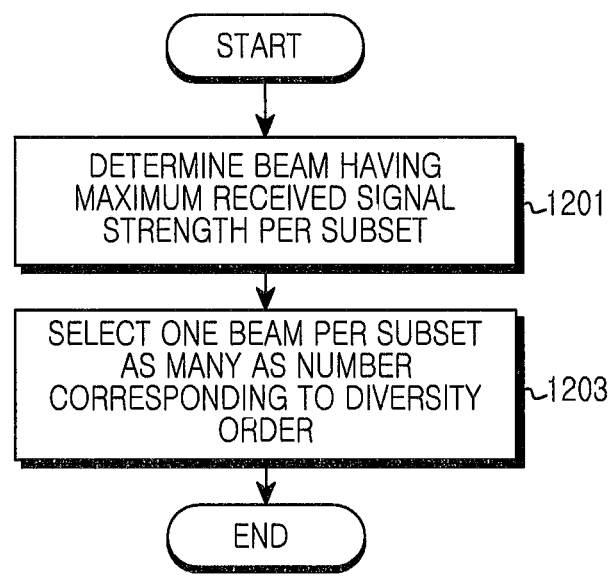
FIG. 12 illustrates a procedure of determining a combination of beams in a receiving end in a wireless communication system according to an embodiment of the present disclosure.

FIG. 12 illustrates a procedure of determining a combination of beams in a receiving end in a wireless communication system according to an exemplary embodiment of the present disclosure.

Referring to FIG. 12, in step 1201, the receiving end determines beams having the maximum received signal strengths by subset. In other words, the receiving end measures a received signal strength for each of all transmit beams of a transmitting end, and determines a beam having the maximum received signal strength in each subset. In accordance with this, as many beams as the number of subsets are identified.

After that, the receiving end proceeds to step 1203 and selects one beam per subset as many as the number corresponding to a diversity order. That is, the receiving end selects as many beams as the number corresponding to the diversity order among the beams having the maximum received signal strengths by subset identified in step 1201. For example, the receiving end can select the beams having the greatest received signal strengths. For another example, the receiving end can select beams of a combination of the greatest correlation among the beams by subset.

Figure 13:
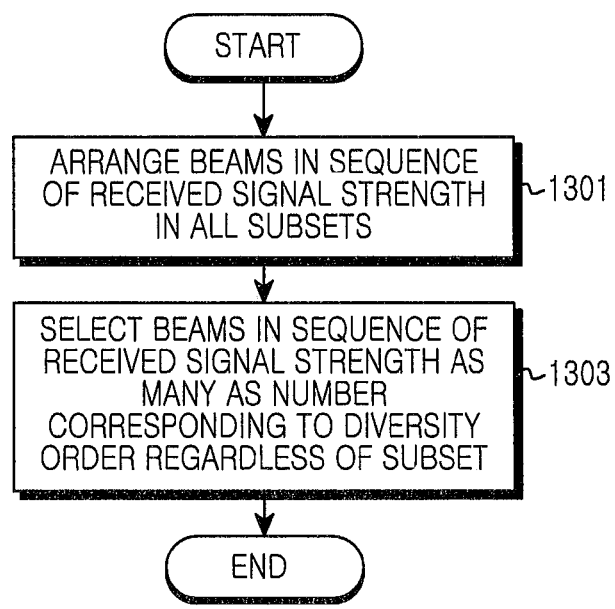
FIG. 13 illustrates a procedure of determining a combination of beams in a receiving end in a wireless communication system according to another embodiment of the present disclosure.

FIG. 13 illustrates a procedure of determining a combination of beams in a receiving end in a wireless communication system according to another exemplary embodiment of the present disclosure.

Referring to FIG. 13, in step 1301, the receiving end arranges beams in sequence of received signal strengths in all subsets. That is, the receiving end arranges the beams regardless of the subset.

After that, the receiving end proceeds to step 1303 and selects beams in accordance with the received signal strength sequence as many as the number corresponding to a diversity order regardless of the subset. For example, if the diversity order is equal to '2', the receiving end includes in the beam combination two beams of high received signal strengths among the whole beams.

The exemplary embodiment illustrated in FIG. 13 selects the beams regardless of the subset. In accordance with another exemplary embodiment of the present disclosure, the receiving end can select the beams as many as the number corresponding to the diversity order, however, determine the beam combination by beams of one subset. At this time, the one subset can be selected by a predefined criterion. For example, the one subset can be a subset of the greatest average signal strength.

Figure 14:
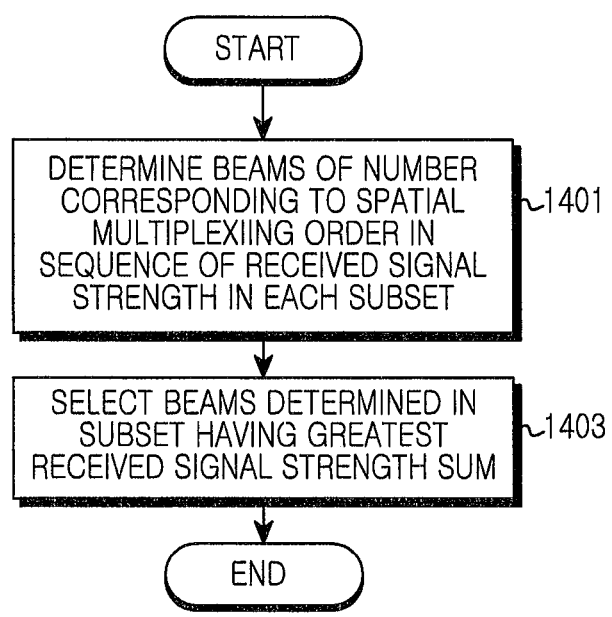
FIG. 14 illustrates a procedure of determining a combination of beams in a receiving end in a wireless communication system according to a further embodiment of the present disclosure.

FIG. 14 illustrates a procedure of determining a combination of beams in a receiving end in a wireless communication system according to a further exemplary embodiment of the present disclosure.

Referring to FIG. 14, in step 1401, the receiving end determines beams of the number corresponding to a spatial multiplexing order in sequence of received signal strengths in each subset. For example, when the spatial multiplexing order is equal to '2', the receiving end determines two beams of high received signal strengths in each subset. In accordance with this, the two beams having the high received signal strengths are identified every each subset.

Next, the receiving end proceeds to step 1403 and identifies the beams determined in the subset having the greatest received signal strength sum. In other words, the receiving end calculates a received signal strength sum by subset of the beams identified in step 1401, and includes in the beam combination the beams which are identified in the subset having the greatest received signal strength sum.

Figure 15:
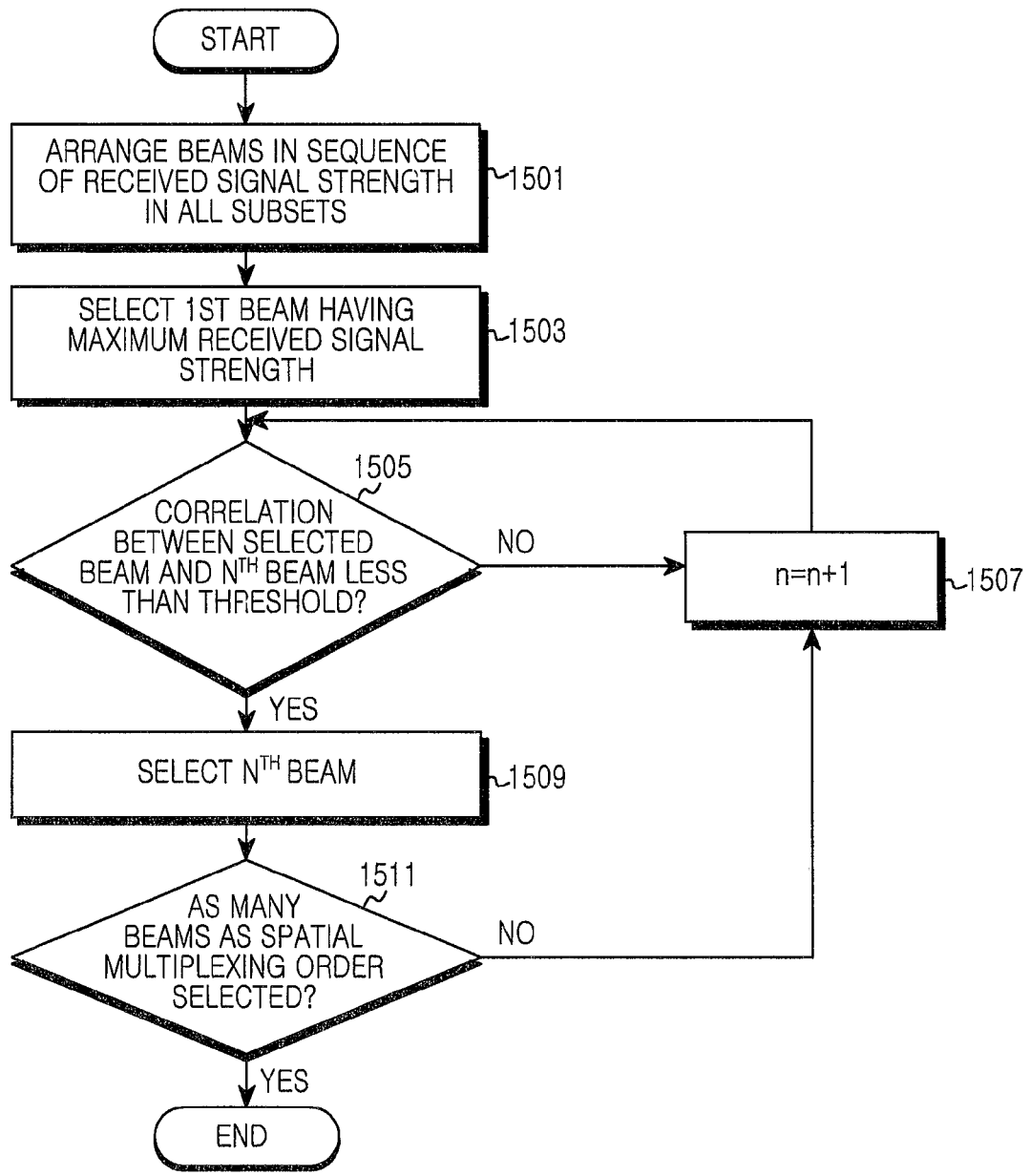
FIG. 15 illustrates a procedure of determining a combination of beams in a receiving end in a wireless communication system according to a yet another embodiment of the present disclosure.

FIG. 15 illustrates a procedure of determining a combination of beams in a receiving end in a wireless communication system according to a yet another exemplary embodiment of the present disclosure.

Referring to FIG. 15, in step 1501, the receiving end arranges beams in sequence of received signal strengths in all subsets. That is, the receiving end arranges the beams regardless of the subset.

After arranging the beams, the receiving end proceeds to step 1503 and selects a $1^{st}$ beam having the maximum received signal strength. In other words, the receiving end includes in the beam combination a beam having the greatest received signal strength among the whole transmit beams.

Next, the receiving end proceeds to step 1505 and determines if a correlation between the selected beam and an $n^{th}$ beam is less than a threshold. Here, the 'n' is initialized to the initial '2'. If the correlation is equal to or is greater than the threshold, the receiving end proceeds to step 1507 and increases the 'n' by '1' and then, returns to step 1505. At this time, when the selected beam is numerous, determining whether the correlation is less than the threshold is performed for each of the selected beams. If a correlation between at least one selected beam and the $n^{th}$ beam is equal to or is greater than the threshold, the receiving end proceeds to step 1507.

In contrast, if the correlation is less than the threshold, the receiving end proceeds to step 1509 and selects the $n^{th}$ beam. In other words, the receiving end includes the $n^{th}$ beam in the beam combination Next, the receiving end proceeds to step 1511 and determines if the beams have been selected as many as a spatial multiplexing order. In other words, the receiving end determines whether it completes the selection of beams of the required number. If the beams are not selected as many as the spatial multiplexing order, the receiving end returns to step 1507 and increases the 'n' by 1' and then, proceeds to step 1505. That is, the receiving end repeats step 1505 to step 1509 until the beams are selected as many as the spatial multiplexing order.

Figure 16:
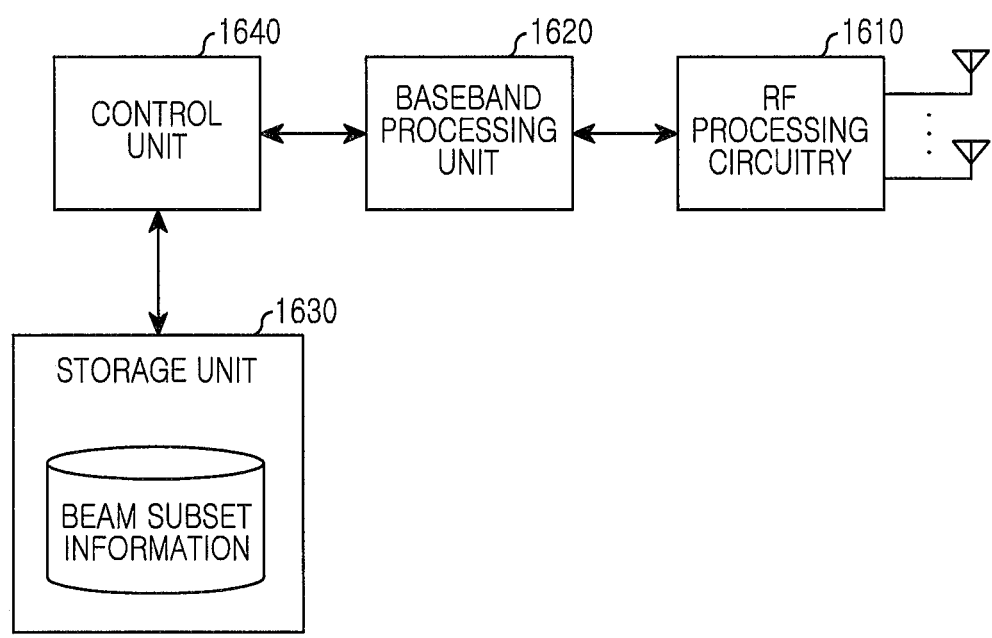
FIG. 16 is a block diagram illustrating a construction of a transmitting end in a wireless communication system according to another embodiment of the present disclosure.

FIG. 16 is a block diagram illustrating a construction of a transmitting end in a wireless communication system according to another exemplary embodiment of the present disclosure.

Referring to FIG. 16, the transmitting end includes an RF processing circuitry 1610, a baseband processing circuitry 1620, a storage unit 1630, and a control unit 1640.

The RF processing circuitry 1610 performs a function for transmitting/receiving a signal through a wireless channel such as signal band conversion, amplification and the like. That is, the RF processing circuitry 1610 up converts a baseband signal provided from the baseband processing circuitry 1620 into an RF band signal and then transmits the RF band signal through an antenna, and down converts an RF band signal received through the antenna into a baseband signal. For example, the RF processing circuitry 1610 can include a transmission filter, a reception filter, an amplifier, a mixer, an oscillator, a Digital to Analog Converter (DAC), an Analog to Digital Converter (ADC) and the like. As illustrated in FIG. 16, the transmitting end includes a plurality of antennas, and the plurality of antennas can construct at least one array antenna. Also, the RF processing circuitry 1610 can include RF chains of the number corresponding to the plurality of antennas. And, the RF processing circuitry 1610 performs analog beamforming. For the analog beamforming, the RF processing circuitry 1610 can include a construction such as the analog beamforming block 130, 230 or 330 of FIG. 1, FIG. 2 or FIG. 3.

The baseband processing circuitry 1620 performs a function of conversion between a baseband signal and a bit stream in accordance with a physical layer standard of a system. For example, at data transmission, the baseband processing circuitry 1620 generates complex symbols by encoding and modulating a transmission bit stream. Also, at feedback information reception, the baseband processing circuitry 1620 restores a reception bit stream by demodulating and decoding a baseband signal provided from the RF processing circuitry 1610. For example, when following an OFDM method, at data transmission, the baseband processing circuitry 1620 generates complex symbols by encoding and modulating a transmission bit stream, and maps the complex symbols to subcarriers and then, constructs OFDM symbols through IFFT operation and Cyclic Prefix (CP) insertion. Also, at feedback information reception, the baseband processing circuitry 1620 splits a baseband signal provided from the RF processing circuitry 1610 into an OFDM symbol unit, and restores signals mapped to subcarriers through FFT operation, and then restores a reception bit stream through demodulation and decoding. Also, the baseband processing circuitry 1620 performs digital beamforming. For the sake of the digital beamforming, the baseband processing circuitry 1620 can include a construction such as the digital beamforming block 110, 210 or 310 of FIG. 1, FIG. 2 or FIG. 3.

The baseband processing circuitry 1620 and the RF processing circuitry 1610 transmit and receive a signal as aforementioned. In accordance with this, the baseband processing circuitry 1620 and the RF processing circuitry 1610 can be denoted as a transmission unit, a reception unit, or a transmission/reception unit (e.g., transceiver).

The storage 1630 stores data such as a basic program for operation of the transmitting end, an application program, setting information and the like. Particularly, the storage 1630 stores information of a transmit beam subset which is defined on a basis of a correlation between transmit beams of the transmitting end. For example, the transmit beam subset can be defined in accordance with an algorithm of Table 1 above or Table 2 above. Or, the storage 1630 can store information of a receive beam subset which is defined on a basis of a correlation between receive beams of the transmitting end. And, the storage 1630 provides stored data in response to a request of the control unit 1640.

The controller 1640 controls general operations of the transmitting end. For example, the controller 1640 transmits/receives a signal through the baseband processing circuitry 1620 and the RF processing circuitry 1610. In accordance with an exemplary embodiment of the present disclosure, the control unit 1640 provides beam subset information to the receiving end, and performs a control for performing beamforming in accordance to feedback information of the receiving end. For example, the controller 1640 controls the transmitting end to perform the procedure illustrated in FIG. 11. An operation of the controller 1640 according to an exemplary embodiment of the present disclosure is given as follows.

The controller 1640 transmits beam subset information stored in the storage unit 1630 of the transmitting end, to the receiving end through the baseband processing circuitry 1620 and the RF processing circuitry 1610. After that, the control unit 1640 receives feedback information including a transmit beam combination and a selection result of a precoding matrix, from the receiving end through the RF processing circuitry 1610 and the baseband processing circuitry 1620. The controller 1640 controls the baseband processing circuitry 1620 and the RF processing circuitry 1610 to digital beamform and analog beamform a data signal in accordance to the received feedback information.

Figure 17:
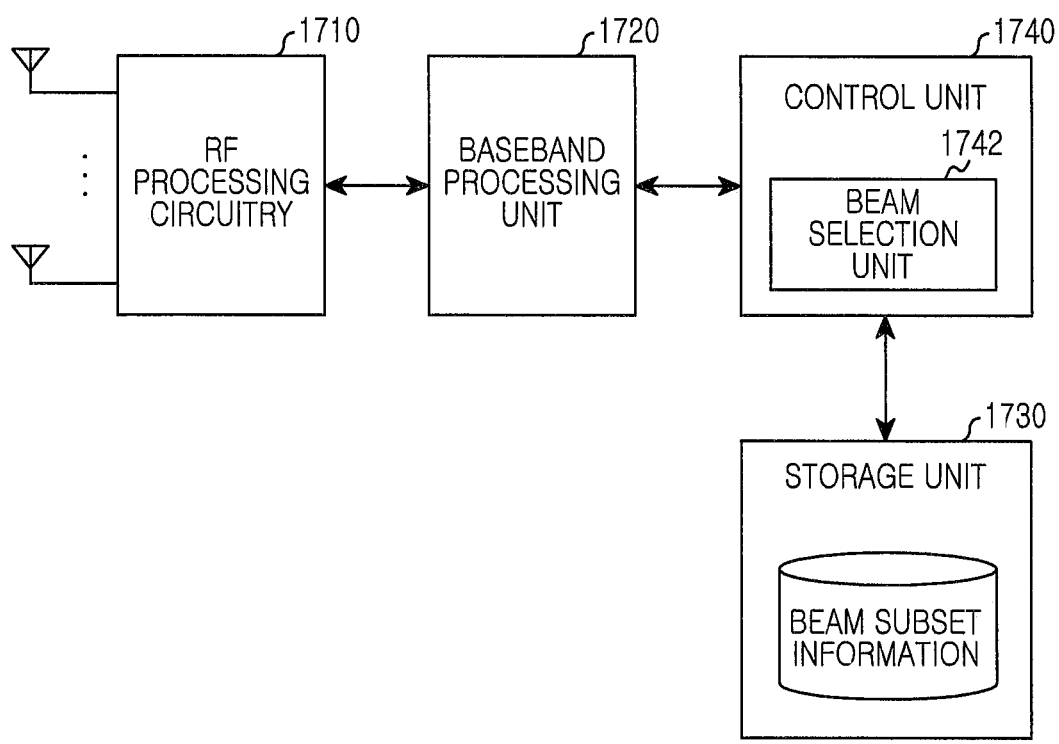
FIG. 17 is a block diagram illustrating a construction of a receiving end in a wireless communication system according to another embodiment of the present disclosure.

FIG. 17 is a block diagram illustrating a construction of a receiving end in a wireless communication system according to another exemplary embodiment of the present disclosure.

Referring to FIG. 17, the receiving end includes an RF processing circuitry 1710, a baseband processing circuitry 1720, a storage unit 1730, and a control unit 1740.

The RF processing circuitry 1710 performs a function for transmitting/receiving a signal through a wireless channel such as signal band conversion, amplification and the like. That is, the RF processing circuitry 1710 up converts a baseband signal provided from the baseband processing circuitry 1720 into an RF band signal and then transmits the RF band signal through an antenna, and down converts an RF band signal received through the antenna into a baseband signal. For example, the RF processing circuitry 1710 can include a transmission filter, a reception filter, an amplifier, a mixer, an oscillator, a DAC, an ADC and the like. As illustrated in FIG. 17, the receiving end includes a plurality of antennas, and the plurality of antennas can construct at least one array antenna.

Also, the RF processing circuitry 1710 can include RF chains of the number corresponding to the plurality of antennas. And, the RF processing circuitry 1710 performs analog beamforming. For the analog beamforming, the RF processing circuitry 1710 can include a construction such as the analog beamforming block 130, 230 or 330 of FIG. 1, FIG. 2 or FIG. 3.

The baseband processing circuitry 1720 performs a function of conversion between a baseband signal and a bit stream in accordance with a physical layer standard of a system. For example, at feedback information transmission, the baseband processing circuitry 1720 generates complex symbols by encoding and modulating a transmission bit stream. Also, at data reception, the baseband processing circuitry 1720 restores a reception bit stream by demodulating and decoding a baseband signal provided from the RF processing circuitry 1710. For example, when following an OFDM method, at feedback information transmission, the baseband processing circuitry 1720 generates complex symbols by encoding and modulating a transmission bit stream, and maps the complex symbols to subcarriers and then, constructs OFDM symbols through IFFT operation and CP insertion. Also, at data reception, the baseband processing circuitry 1720 splits a baseband signal provided from the RF processing circuitry 1710 into an OFDM symbol unit, and restores signals mapped to subcarriers through FFT operation, and then restores a reception bit stream through demodulation and decoding. Also, the baseband processing circuitry 1720 can perform digital beamforming. For the sake of the digital beamforming, the baseband processing circuitry 1720 can include a construction such as the digital beamforming block 110, 210 or 310 of FIG. 1, FIG. 2 or FIG. 3.

The baseband processing circuitry 1720 and the RF processing circuitry 1710 transmit and receive a signal as aforementioned. In accordance with this, the baseband processing circuitry 1720 and the RF processing circuitry 1710 can be denoted as a transmission unit, a reception unit, or a transmission/reception unit.

The storage unit 1730 stores data such as a basic program for operation of the receiving end, an application program, setting information and the like. Particularly, the storage unit 1730 stores information of a transmit beam subset which is defined on a basis of a correlation between transmit beams of the transmitting end provided from the transmitting end. For example, the transmit beam subset can be defined in accordance to an algorithm of Table 1 above or Table 2 above. Or, the storage unit 1730 can store information of a receive beam subset which is defined on a basis of a correlation between receive beams of the transmitting end. Furthermore, the storage unit 1730 can further store information of a receive beam subset which is defined on a basis of a correlation between receive beams of the receiving end, or information of a transmit beam subset which is defined on a basis of a correlation between transmit beams of the receiving end. And, the storage unit 1730 provides stored data in response to a request of the control unit 1740.

The control unit 1740 controls general operations of the receiving end. For example, the control unit 1740 transmits/receives a signal through the baseband processing circuitry 1720 and the RF processing circuitry 1710. In accordance with an exemplary embodiment of the present disclosure, the control unit 1740 can receive beam subset information from a transmitting end, and determine an analog beam combination which will be used for data communication and a digital beam, on the basis of the beam subset information. For example, the control unit 1740 controls the receiving end to perform the procedure illustrated in FIG. 10. Also, the control unit 1740 controls the receiving end to perform the procedures illustrated in FIG. 12 to FIG. 15. An operation of the control unit 1740 according to an exemplary embodiment of the present disclosure is given as follows.

The control unit 1740 receives transmit beam subset information of a transmitting end through the RF processing circuitry 1710 and the baseband processing circuitry 1720, and measures a channel quality using a reference signal transmitted by the transmitting end. Next, after the control unit 1740 determines a transmit beam combination which will be applied to a data signal on the basis of the beam subset information of the transmitting end, the control unit 1740 calculates an effective channel according to the transmit beam combination. After calculating the effective channel, the control unit 1740 selects a precoding matrix suitable to a MIMO mode on the basis of the effective channel. After selecting the precoding matrix, the control unit 1740 generates feedback information including the transmit beam combination and the selection result of the precoding matrix, and then transmits the generated feedback information to the transmitting end through the baseband processing circuitry 1720 and the RF processing circuitry 1710. Next, the control unit 1740 receives a data signal, which is digital beamformed and analog beamformed in accordance to the feedback information, from the transmitting end.

During the aforementioned operation of the control unit 1740, rules predefined in accordance with a MIMO mode are applied in determining the transmit beam combination. For example, when the MIMO mode is a diversity mode, the transmit beam combination can be determined by selecting one beam having the maximum received signal strength in each subset. For another example, when the MIMO mode is the diversity mode, the transmit beam combination can be determined considering received signal strengths of beams regardless of the subset. For further example, when the MIMO mode is the diversity mode, the transmit beam combination can be determined by only beams of specific one subset. For example, when the MIMO mode is a spatial multiplexing mode, the transmit beam combination can be determined by selecting beams of the required number having high received signal strengths in each subset and then selecting a subset having the greatest received signal strength sum. For another example, when the MIMO mode is the diversity mode, the transmit beam combination can be determined considering a correlation between beams regardless of the subset.

Exemplary embodiments of the present disclosure can perform effective beamforming by defining subsets of beams in accordance to correlations between analog beams and selecting beams considering the subset in accordance with a MIMO mode in a wireless communication system supporting hybrid beamforming.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the aforementioned detailed exemplary embodiments of the present disclosure, constituent elements included in the disclosure have been expressed in the singular number or plural number in accordance with a proposed detailed exemplary embodiment. But, the expression of the singular number or plural number is selected suitable to a given situation for description convenience's sake. The present disclosure is not limited to a single or plural constituent element. Although constituent elements are expressed in the plural number, the constituent elements can be constructed in the singular number or, although the constituent elements are expressed in the singular number, the constituent elements can be constructed in the plural number.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A method for operating a receiving end in a wireless communication system, the method comprises:
   receiving subset information on analog beams of a transmitting end, from the transmitting end; and
   transmitting information on a combination of transmit beams to be used for data signal transmission to the receiving end, which is determined based on the subset information,
   wherein the subset information indicates one of: at least one subset into which the analog beams are classified, and information used to classify the at least one subset, and
   wherein each analog beam of the at least one subset has a correlation equal to or less than a threshold, with one another.

2. The method of claim 1, wherein the combination of the transmit beams belong to a same subset, and are spatially multiplexed.

3. The method of claim 2, wherein the determining the combination of the transmit beams comprises,
   identifying a number of analog beams that provide the best channel quality in each subset, wherein the number corresponds to a multiplexing order;
   determining a channel quality sum of the number of the analog beams that are identified in each subset; and
   designating analog beams having the greatest channel quality sum in each subset as the combination of the transmit beams.

4. The method of claim 1, wherein the combination of the transmit beams comprises a number of transmit beams providing the greatest channel quality values, each transmit beam having a correlation less than a threshold, among all of the transmit beams, as a beam combination for spatial multiplexing, wherein the number is a same as a multiplexing order.

5. The method of claim 4, wherein determining the combination of the transmit beams comprises,
   selecting a first beam having the maximum channel quality among all of analog beams of the transmitting end;
   comparing the first beam with each of remnant beams in an order of higher channel quality;
   if a correlation between the first beam and one of the remnant beams is equal to or is greater than the threshold, excluding the one beam from the combination of the transmit beams; and
   if the correlation is less than the threshold, including the one beam into the combination of the transmit beams.

6. The method of claim 1, wherein the combination of the transmit beams belong to different subsets for diversity.

7. The method of claim 6, wherein the determining the combination of the transmit beams comprises,
   selecting a first beam having the maximum channel quality among all of the analog beams of the transmitting end;
   comparing the first beam with each one of remnant analog beams in an order of higher channel quality;
   if one remnant analog beam belongs to the same subset as the first beam, excluding the one remnant analog beam from the combination of the transmit beams; and
   if the one remnant analog beam does not belong to the same subset as the first beam, including the one analog beam into the combination of the transmit beams.

8. The method of claim 1, wherein the combination of the transmit beams comprises the transmit beams of a subset, or a number of transmit beams having the greatest channel quality values among all of the transmit beams, wherein the number is a same as a diversity order, as a beam combination for diversity.

9. The method of claim 1, wherein the subset information comprises at least one of a set of magnitude and phase value vectors constituting analog beam coefficient of the transmitting end, a set of steering angle values representing the analog beam coefficients of the transmitting end, and a bitmap according to Multiple Input Multiple Output (MIMO) mode, representing classified subsets of the transmitting end.

10. The method of claim 9, further comprising:
    determining subsets classifying transmit beams such that correlations of all pair of two transmit beams of the subset are equal to or are less than the threshold.

11. The method of claim 1, wherein the at least one subset is determined distinctively in accordance with a Multiple Input Multiple Output (MIMO) mode.

12. The method of claim 1, wherein the subset information is received as system information periodically broadcasted, or is received during an initial access procedure, or is received after the initial access procedure, or is received as system information exchanged during a handover procedure.

13. The method of claim 1, further comprising:
    measuring a channel quality by transmit beam using at least one reference signal transmitted by the transmitting end.

14. The method of claim 1, further comprising:
    determining an effective channel according to the combination of the transmit beams;
    selecting a precoding matrix for digital beamforming based the effective channel;
    transmitting the combination of the transmit beams and the selected precoding matrix to the transmitting end; and receiving a data signal that is digital-beamformed by the precoding matrix and is analogly beamformed by the combination of the transmit beams in the transmitting end.

15. A method for operating a transmitting end in a wireless communication system, the method comprises:
    transmitting subset information on analog beams of the transmitting end;
    receiving, from a receiving end, information on a combination of transmit beams which is determined based on the subset information; and
    transmitting, to the receiving end, data signals with analog beamforming using the combination of the transmit beams,
    wherein the subset information indicates one of: at least one subset into which the analog beams are classified, and, information used to classify the at least one subset, and
    wherein each analog beam of the at least one subset has a correlation equal to or less than a threshold, with one another.

16. The method of claim 15, wherein the combination of the transmit beams belong to a same subset and are spatially multiplexed.

17. The method of claim 15, wherein the combination of the transmit beams belong to different subsets for diversity.

18. The method of claim 15, wherein the subset information comprises at least one of a set of magnitude and phase value vectors constituting analog beam coefficients of the transmitting end, a set of steering angle values representing the analog beam coefficients of the transmitting end, and a bitmap according to MIMO mode representing a classified subset of the transmitting end.

19. The method of claim 15, wherein the subset information comprises different subset in accordance with a MIMO mode.

20. The method of claim 15, wherein the subset information is received as system information periodically broadcasted, or is received during an initial access procedure, or is received after the initial access procedure, or is received as system information exchanged during a handover procedure.

21. An apparatus for a receiving end in a wireless communication system, the apparatus comprising:
    a reception unit configured to receive subset information on analog beams of a transmitting end, from the transmitting end; and
    a transmission unit configured to transmit information on a combination of transmit beams to be used for data signal transmission to the receiving end, which is determined based on the subset information,
    wherein the subset information indicates one of: at least one subset into which the analog beams are classified, and, information used to classify the at least one subset, and
    wherein each analog beam of the at least one subset has a correlation equal to or less than a threshold, with one another.

22. The apparatus of claim 21, wherein the combination of the transmit beams belong to the same subset, and are spatially multiplexed.

23. The apparatus of claim 22, further comprising: a controller configured to:
    identify a subset of analog beams providing the best channel quality, calculate a channel quality sum of the analog beams of each subset, and determine the subset having the greatest channel quality sum, as the combination of the transmit beams.

24. The apparatus of claim 21, wherein the combination of the transmit beams comprises a number of transmit beams having the greatest channel quality values and each transmit beams having a correlation less than a threshold, among all of the transmit beams, as a beam combination for spatial multiplexing, wherein the number is a same as a multiplexing order.

25. The apparatus of claim 24, further comprising: a controller configured to:
    select a first beam having the maximum channel quality among all the analog transmit beams of the transmitting end,
    compare the first beam with each one of remnant beams in an order of high channel quality,
    exclude one of the remnant analog beams from the combination of the transmit beams if a correlation between the first beam and the one of the remnant analog beams is equal to or is greater than the threshold; and
    include the one of the remnant analog beams into the combination of the transmit beams if the correlation is less than the threshold.

26. The apparatus of claim 21, wherein the combination of the transmit beams belong to different subsets for diversity.

27. The apparatus of claim 26, further comprising: a controller configured to:
    select a first beam having the maximum channel quality among all the analog beams of the transmitting end,
    compare the first beam with each one of remnant analog beams in an order of high channel quality is high,
    exclude one of the remnant analog beams from the combination of the transmit beams if the one of the remnant analog beam belongs to a same subset as the first beam,
    include the one of the remnant beams into the combination of the transmit beams if the one of the remnant beam does not belong to the same subset as the first beam.

28. The apparatus of claim 21, further comprising: a controller configured to:
    determine the combination of the transmit beams, wherein each transmit beam belong to a specific subset, or a number of transmit beams is a same as a diversity order for greatest channel quality, as a beam combination for diversity.

29. The apparatus of claim 21, wherein the subset information comprises at least one of a set of magnitude and phase value vectors constituting analog beam coefficients of the transmitting end, a set of steering angle values representing the analog beam coefficients of the transmitting end, and a bitmap according to MIMO mode, representing classified subsets of the transmitting end.

30. The apparatus of claim 29, further comprising: a controller configured to:
    determine subset classifying transmit beams such that correlations of all pair of two transmit beams of the subset are equal to or are less than the threshold.

31. The apparatus of claim 21, wherein the at least one subset is determined distinctively in accordance with a Multiple Input Multiple Output (MIMO) mode.

32. The apparatus of claim 21, wherein the subset information is received as system information periodically broadcasted, or is received during an initial access procedure, or is received after the initial access procedure, or is received as system information exchanged during a handover procedure.

33. The apparatus of claim 21, further comprising: a controller configured to
    measure a channel quality by transmit beam using at least one reference signal transmitted by the transmitting end.

34. The apparatus of claim 21, further comprising: a controller is configured to:
- calculate an effective channel according to the combination of the transmit beams; and
- select a precoding matrix for digital beamforming based on the effective channel, and
- wherein the transmission unit is configured to transmit the combination of the transmit beams and the selected precoding matrix to the transmitting end, and
- wherein the reception unit is configured to receive a data signal that is digital-beamformed by the precoding matrix and is analog-beamformed by the combination of the transmit beams in the transmitting end.

35. An apparatus for a transmitting end in a wireless communication system, the apparatus comprising:
- a transmission unit configured to transmit subset information on analog beams of the transmitting end; and
- a reception unit configured to receive, from the receiving end, information on a combination of transmit beams determined based on the subset information; and
- wherein the transmission unit is further configured to transmit, to the receiving end, data signals with analog beamforming using the combination of the transmit beams,
- wherein the subset information indicates one of: at least one subset into which the analog beams are classified, and, information used to classify the at least one subset, and
- wherein each analog beam of the at least one subset has a correlation equal to or less than a threshold, with one another.

36. The apparatus of claim 35, wherein the combination of the transmit beams belong to a same subset and are spatially multiplexed.

37. The apparatus of claim 35, wherein the combination of the transmit beams belong to different subsets for diversity.

38. The apparatus of claim 35, wherein the subset information comprises at least one of a set of magnitude and phase value vectors constituting analog beam coefficients of the transmitting end, a set of steering angle values representing the analog beam coefficients of the transmitting end, and a bitmap according to MIMO mode, representing a classified subset of the transmitting end.

39. The apparatus of claim 35, wherein the subset information comprises different subset classifying results in accordance with a MIMO mode.

40. The apparatus of claim 35, wherein the subset information is received as system information periodically broadcasted, or is received during an initial access procedure, or is received after the initial access procedure, or is received as system information exchanged during a handover procedure.

* * * * *